(12) United States Patent
Granger et al.

(10) Patent No.: US 10,427,183 B2
(45) Date of Patent: Oct. 1, 2019

(54) DISCRETE MAGNETIC NANOPARTICLES

(71) Applicant: UNIVERSITY OF UTAH RESEARCH FOUNDATION, Salt Lake City, UT (US)

(72) Inventors: Michael C. Granger, Salt Lake City, UT (US); Jooneon Park, Salt Lake City, UT (US); Marc D. Porter, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 620 days.

(21) Appl. No.: 14/996,383

(22) Filed: Jan. 15, 2016

(65) Prior Publication Data

US 2016/0211062 A1 Jul. 21, 2016

Related U.S. Application Data

(60) Provisional application No. 62/125,227, filed on Jan. 15, 2015.

(51) Int. Cl.
| | |
|---|---|
| *B05D 1/00* | (2006.01) |
| *H01F 1/00* | (2006.01) |
| *B22F 1/02* | (2006.01) |
| *B22F 1/00* | (2006.01) |
| *B82Y 25/00* | (2011.01) |

(52) U.S. Cl.
CPC .............. *B05D 1/007* (2013.01); *B22F 1/02* (2013.01); *B22F 1/025* (2013.01); *H01F 1/0054* (2013.01); *B22F 1/0018* (2013.01); *B22F 1/0062* (2013.01); *B22F 2001/0037* (2013.01); *B82Y 25/00* (2013.01); *C01P 2004/64* (2013.01); *C21D 2211/005* (2013.01)

(58) Field of Classification Search
CPC ............................. H01F 1/0054; B82Y 25/00
See application file for complete search history.

(56) References Cited

U.S. PATENT DOCUMENTS

| | | |
|---|---|---|
| 5,981,297 A | 11/1999 | Baselt |
| 8,557,329 B2 | 10/2013 | Dai et al. |
| 2013/0020526 A1 | 1/2013 | Cheon et al. |

OTHER PUBLICATIONS

Sun et al, "Layer-by-layer Assembly of Conjugated Polyelectrolytes on Magnetic Nanoparticle Surfaces", Langmuir, 25(10), 2009, pp. 5969-5973.*
Zhang et al, "Functionalization of high-moment magnetic nanodicks for cell maniplulation and separation", Nano Research, vol. 6, issue 10, Oct. 2013, pp. 745-751.*
Wong et al, "Magnetic Nanopaericle-Polyelectrolyte Interaction: A layered Approach for Biomedical Applicatios", Journal of Nanoscience and Nanaotechnology, vol. 8, No. 8, 2008, pp. 4033-4040.*
Ahrens, E. T.; Bulte, J. W., Tracking immune cells in vivo using magnetic resonance imaging. Nat. Rev. Immunol. 2013, 13, (10), 755-763.
Balasubramaniam, S.; Kayandan, S.; Lin, Y.-N.; Kelly, D. F.; House, M. J.; Woodward, R. C.; St. Pierre, T. G.; Riffle, J. S.; Davis, R. M., Toward Design of Magnetic Nanoparticle Clusters Stabilized by Biocompatible Diblock Copolymers for T 2-Weighted MRI Contrast. Langmuir 2014, 30, (6), 1580-1587.
Barnakov, Y.; Yu, M.; Rosenzweig, Z. Manipulation of the Magnetic Properties of Magnetite-Silica Nanocomposite Materials by Controlled Stober Synthesis. Langmuir 2005, 21, 7524-7527.
Beyer, S.; Bai, J.; Blocki, A. M.; Kantak, C.; Xue, Q.; Raghunath, M.; Trau, D., Assembly of biomacromolecule loaded polyelectrolyte multilayer capsules by using water soluble sacrificial templates. Soft Matter 2012, 8, (9), 2760-2768.
Binns, C., Nanomagnetism: Fundamentals and Applications. Elsevier: Amsterdam, 2014; vol. 6, table of contents and title pages.
Blanco-Mantecon, M.; O'Grady, K., Interaction and size effects in magnetic nanoparticles. J. Magn. Magn. Mater. 2006, 296, (2), 124-133.
Carta, D.; Bullita, S.; Casula, M. F.; Casu, A.; Falqui, A.; Corrias, A., Cubic Mesoporous Silica (SBA 16) Prepared Using Butanol as the Co Surfactant: A General Matrix for the Preparation of FeCo SiO2 Nanocomposites. ChemPlusChem 2013, 78, (4), 364-374.
Caruso, F.; Caruso, R. A.; Möhwald, H., Nanoengineering of inorganic and hybrid hollow spheres by colloidal templating. Science 1998, 282, (5391), 1111-1114.
Caruso, F.; Lichtenfeld, H.; Giersig, M.; Möhwald, H., Electrostatic self-assembly of silica nanoparticle-polyelectrolyte multilayers on polystyrene latex particles. J. Am. Chem. Soc. 1998, 120, (33), 8523-8524.
Caruso, F.; Spasova, M.; Susha, A.; Giersig, M.; Caruso, R. A., Magnetic nanocomposite particles and hollow spheres constructed by a sequential layering approach. Chem. Mater. 2001, 13, (1), 109-116.
Che, X.-d.; Neal Bertram, H., Phenomenology of δM curves and magnetic interactions. J. Magn. Magn. Mater. 1992, 116, (1), 121-127.
Chen, Y.; Li, M.; Hong, Y.; Lam, J. W.; Zheng, Q.; Tang, B. Z., Dual-Modal MRI Contrast Agent with Aggregation-Induced Emission Characteristic for Liver Specific Imaging with Long Circulation Lifetime. ACS App. Mater. Inter. 2014, 6, (13), 10783-10791.
Colombo, M.; Carregal-Romero, S.; Casula, M. F.; Gutiérrez, L.; Morales, M. P.; Böhm, I. B.; Heverhagen, J. T.; Prosperi, D.; Parak, W. J., Biological applications of magnetic nanoparticles. Chem. Soc. Rev. 2012, 41, (11), 4306-4334.
Cornell, R.; Schwertmann, U., The iron oxides: structure, properties, reactions, occurrences and uses. 2nd ed.; Wiley-VCH Verlag GmbH & Co. KGaA: Weinheim, 2003, 1-14.
Cumbal, L.; Greenleaf, J.; Leun, D.; SenGupta, A. K., Polymer supported inorganic nanoparticles: characterization and environmental applications. React. Funct. Polym. 2003, 54, (1), 167-180.

(Continued)

*Primary Examiner* — C Melissa Koslow
(74) *Attorney, Agent, or Firm* — Michael Best & Friedrich LLP

(57) ABSTRACT

Discrete magnetic nanoparticles synthesized using a layer-by-layer technique are disclosed. The nanoparticles contain a magnetic core having a large magnetic moment, a plurality of layers and an exterior coating. The nanoparticles have utility in a wide range of biological and bioanalytical applications.

15 Claims, 18 Drawing Sheets
(5 of 18 Drawing Sheet(s) Filed in Color)

(56) References Cited

OTHER PUBLICATIONS

Dai, Q.; Berman, D.; Virwani, K.; Frommer, J.; Jubert, P.-O.; Lam, M.; Topuria, T.; Imaino, W.; Nelson, A., Self-Assembled Ferrimagnet—Polymer Composites for Magnetic Recording Media. Nano Lett. 2010, 10, (8), 3216-3221.

Dai, Q.; Lam, M.; Swanson, S.; Yu, R.-H. R.; Milliron, D. J.; Topuria, T.; Jubert, P.-O.; Nelson, A., Monodisperse cobalt ferrite nanomagnets with uniform silica coatings. Langmuir 2010, 26, 17546-17551.

Downs, R. T., The RRUFF Project: an integrated study of the chemistry, crystallography, Raman and infrared spectroscopy of minerals. In Program and Abstracts of the 19th General Meeting of the International Mineralogical Association, Kobe, Japan, 2006.

Falqui, A.; Corrias, A.; Gass, M.; Mountjoy, G., A Transmission Electron Microscopy Study of Fe—Co Alloy Nanoparticles in Silica Aerogel Matrix Using HREM, EDX, and EELS. Microsc. Microanal. 2009, 15, (02), 114-124.

Faraudo, J.; Andreu, J. S.; Camacho, J., Understanding diluted dispersions of superparamagnetic particles under strong magnetic fields: a review of concepts, theory and simulations. Soft Matter 2013, 9, (29), 6654-6664.

Franco, V.; Batlle, X.; Labarta, a; O'Grady, K. The Nature of Magnetic Interactions in CoFe—Ag(Cu) Granular Thin Films. J. Phys. D. Appl. Phys. 2000, 33, 609-613.

Fratila, R. M.; Mitchell, S. G.; Del Pino, P.; Grazu, V.; de la Fuente, J. M., Strategies for the Biofunctionalization of Gold and Iron Oxide Nanoparticles. Langmuir 2014.

Genc, S.; Derin, B., Synthesis and rheology of ferrofluids: a review. Curr. Opin. Chem. Eng. 2014, 3, 118-124.

Goon, I. Y.; Lai, L. M. H.; Lim, M.; Munroe, P.; Gooding, J. J.; Amal, R., Fabrication and Dispersion of Gold-Shell-Protected Magnetite Nanoparticles: Systematic Control Using Polyethyleneimine. Chem. Mater. 2009, 21, 673-681.

He, J.; Huang, M.; Wang, D.; Zhang, Z.; Li, G., Magnetic separation techniques in sample preparation for biological analysis: A review. J. Pharm. Biomed. Anal. 2014, 84-101.

Henkel, O., Remanenzverhalten und Wechselwirkungen in hartmagnetischen Teilchenkollektiven. Phys. Status Solidi B 1964, 7, (3), 919-929.

Herrmann, I. K.; Schlegel, A.; Graf, R.; Schumacher, C. M.; Senn, N.; Hasler, M.; Gschwind, S.; Hirt, A.-M.; Günther, D.; Clavien, P.-A., Nanomagnet-based removal of lead and digoxin from living rats. Nanoscale 2013, 5, (18), 8718-8723.

Herrmann, I. K.; Urner, M.; Graf, S.; Schumacher, C. M.; Roth Z'graggen, B.; Hasler, M.; Stark, W. J.; Beck Schimmer, B., Endotoxin Removal by Magnetic Separation Based Blood Purification. Adv. Healthc. Mater. 2013, 2, (6), 829-835.

Hu, W.; Wilson, R. J.; Koh, A.; Fu, A.; Faranesh, A. Z.; Earhart, C. M.; Osterfeld, S. J.; Han, S.-J.; Xu, L.; Guccione, S.; Sinclair, R.; Wang, S. X., High-Moment Antiferromagnetic Nanoparticles with Tunable Magnetic Properties. Adv. Mater. 2008, 20, (8), 1479-1483.

Jang, J.-t.; Nah, H.; Lee, J.-H.; Moon, S. H.; Kim, M. G.; Cheon, J., Critical enhancements of MRI contrast and hyperthermic effects by dopant-controlled magnetic nanoparticles. Angew. Chem. Int. Ed. 2009, 48, 1234-1264.

Kelly, P.; O'Grady, K.; Mayo, P.; Chantrell, R., Switching mechanisms in cobaltphosphorus thin films. IEEE Trans. Magn. 1989, 25, 3881-3883.

Keng, P. Y.; Shim, I.; Korth, B. D.; Douglas, J. F.; Pyun, J., Synthesis and self-assembly of polymer-coated ferromagnetic nanoparticles. ACS Nano 2007, 1, (4), 279-292.

Kim, D.; Lee, N.; Park, M.; Kim, B. H.; An, K.; Hyeon, T. Synthesis of Uniform Ferrimagnetic Magnetite Nanocubes. J. Am. Chem. Soc. 2009, 131, 454-455.

Kobayashi, Y.; Horie, M.; Konno, M.; Rodriguez-Gonzalez, B.; Liz-Marzan, L M., Preparation and Properties of Silica-Coated Cobalt Nanoparticles. J. Phys. Chem. B 2003, 107, (30), 7420-7425.

Kolhatkar et al., "Cubic Silica-Coated and Amine-Functionalized FeCo Nanoparticles with High Saturation Magnetization" Chem. Mater. 2013, 25, 1092-1097.

Krogman, K.; Cohen, R.; Hammond, P.; Rubner, M.; Wang, B., Industrial-scale spray layer-by-layer assembly for production of biomimetic photonic systems. Bioinspir. Biomim 2013, 8, (4), 045005, 1-11.

Lattuada, M.; Hatton, T. A., Functionalization of monodisperse magnetic nanoparticles. Langmuir 2007, 23, 2158-2168.

Laurent, S.; Forge, D.; Port, M.; Roch, A.; Robic, C.; Vander Elst, L.; Muller, R. N., Magnetic iron oxide nanoparticles: synthesis, stabilization, vectorization, physicochemical characterizations, and biological applications. Chem. Rev. 2008, 108, (6), 2064-2110.

Laureti, S.; Varvaro, G.; Testa, A.; Fiorani, D.; Agostinelli, E.; Piccaluga, G.; Musinu, A.; Ardu, A.; Peddis, D., Magnetic interactions in silica coated nanoporous assemblies of CoFe2O4 nanoparticles with cubic magnetic anisotropy. Nanotechnology 2010, 21, (31), 315701, 1-6.

Lee, D. C.; Mikulec, F. V.; Pelaez, J. M.; Koo, B.; Korgel, B. A., Synthesis and magnetic properties of silica-coated FePt nanocrystals. J. Phys. Chem. C 2006, 110, (23), 11160-11166.

Li, G.; Wang, S. X.; Sun, S., Model and experiment of detecting multiple magnetic nanoparticles as biomolecular labels by spin valve sensors. IEEE Trans. Magn. 2004, 40, (4, Pt. 2), 3000-3002.

Lim, E.-K.; Kim, T.; Paik, S.; Haam, S.; Huh, Y.-M.; Lee, K., Nanomaterials for Theranostics: Recent Advances and Future Challenges. Chem. Rev. 2015, 327-394.

Liu, W.-T., Nanoparticles and their biological and environmental applications. J. Biosci. Bioeng. 2006, 102, (1), 1-7.

Lu, A.-H.; Salabas, E. L.; Schüth, F., Magnetic nanoparticles: synthesis, protection, functionalization, and application. Angew. Chem. Int. Ed. 2007, 46, 1222-44.

Mahmoudi, M.; Sant, S.; Wang, B.; Laurent, S.; Sen, T., Superparamagnetic iron oxide nanoparticles (SPIONs): development, surface modification and applications in chemotherapy. Adv. Drug Delivery Rev. 2011, 63, (1), 24-46.

Malvern Instruments, Dynamic Light Scattering: An Introduction in 30 Minutes 2015, Documnet No. MRK656-01.

Marcelo, G.; Munoz-Bonilla, A.; Rodriguez-Hernandez, J.; Fernandez-Garcia, M., Hybrid materials achieved by polypeptide grafted magnetite nanoparticles through a dopamine biomimetic surface anchored initiator. Polym. Chem. 2013, 4, (3), 558-567.

Marcelo, G.; Pérez, E.; Corrales, T.; Peinado, C., Stabilization in Water of Large Hydrophobic Uniform Magnetite Cubes by Silica Coating. J. Phys. Chem. C 2011, 115, (51) 25247-25256.

Martinez, J.; Ruiz, F.; Vorobiev, Y. V.; Pérez-Robles, F.; González-Hernández, J., Infrared spectroscopy analysis of the local atomic structure in silica prepared by sol-gel. J. Chem. Phys. 1998, 109, (17), 7511-7514.

McDonald, R. S., Surface functionality of amorphous silica by infrared spectroscopy. J. Phys. Chem. 1958, 62, (10), 1168-1178.

Millen, R. L.; Kawaguchi, T.; Granger, M. C.; Porter, M. D.; Tondra, M., Giant Magnetoresistive Sensors and Superparamagnetic Nanoparticles: A Chip-Scale Detection Strategy for Immunosorbent Assays. Anal. Chem. 2005, 77, (20), 6581-6587.

Morales, M.; Munoz-Aguado, M.; Garcia-Palacios, J.; Lazaro, F.; Serna, C., Coercivity enhancement in γ-Fe2O3 particles dispersed at low-volume fraction. J. Magn. Magn. Mater. 1998, 183, (1), 232-240.

Mørup, S.; Hansen, M. F.; Frandsen, C., Magnetic interactions between nanoparticles. Beilstein J. Nanotech. 2010, 1, (1), 182-190.

Mourdikoudis, S.; Liz-Marzán, L., Oleylamine in Nanoparticle Synthesis. Chem. Mater. 2013, 25, 1465-1476.

Nann, T., Phase-transfer of CdSe@ ZnS quantum dots using amphiphilic hyperbranched polyethylenimine. Chem. Commun. 2005, (13), 1735-1736.

Noh, S.-H.; Na, W.; Jang, J.-T.; Lee, J.-H.; Lee, E. J.; Moon, S. H.; Lim, Y.; Shin, J.-S.; Cheon, J., Nanoscale magnetism control via surface and exchange anisotropy for optimized ferrimagnetic hysteresis. Nano Lett. 2012, 12, 3716-21.

Pablico-Lansigan, M. H.; Situ, S. F.; Samia, A. C. S., Magnetic particle imaging: advancements and perspectives for real-time in vivo monitoring and image-guided therapy. Nanoscale 2013, 5, (10), 4040-4055.

(56) References Cited

OTHER PUBLICATIONS

Pankhurst, Q. A.; Connolly, J.; Jones, S. K.; Dobson, J., Applications of magnetic nanoparticles in biomedicine. J. Phys. D: Appl. Phys. 2003, 36, (13), R167-R181.

Parks, G., The isoelectric points of solid oxides, solid hydroxides, and aqueous hydroxo complex systems. Chem. Rev. 1965, 65, 177-198.

Rittikulsittichai et al., "Preparation, characterization, and utilization of multifunctional magnetic-fluorescent composites for bioimaging and magnetic hyperthermia therapy" RSC Adv., 2013, 3, 7838-7849.

Stöber, W.; Fink, A.; Bohn, E., Controlled growth of monodisperse silica spheres in the micron size range. J. Colloid Interface Sci. 1968, 26, 62-69.

Sun, B.; Zhang, Y.; Gu, K.-J.; Shen, Q.-D.; Yang, Y.; Song, H., Layer-by-layer assembly of conjugated polyelectrolytes on magnetic nanoparticle surfaces. Langmuir 2009, 25, (10), 5969-5973.

Sun, S.; Murray, C. B.; Weller, D.; Folks, L.; Moser, A., Monodisperse FePt nanoparticles and ferromagnetic FePt nanociystal superlattices. Science 2000, 287, (5460), 1989-1992.

Swanson, H. E.; McMurdie, H. F.; Morris, M. C.; Evans, E. H., Standard X-ray diffraction powder patterns, NBS monograph 25, section 5. Institute for Materials Research, National Bureau of Standards: 1967.

Swanson, H. E.; McMurdie, H. F.; Morris, M. C.; Evans, E. H.; Paretzkin, B., Standard x-ray diffraction powder patterns, NBS monograph 25, sections 5 and 9. Institute for Materials Research, National Bureau of Standards: 1971.

Tang, S. C.; Lo, I., Magnetic nanoparticles: essential factors for sustainable environmental applications. Water Res. 2013, 47, (8), 2613-2632.

Thirumal, E.; Prabhu, D.; Chattopadhyay, K.; Ravichandran, V., Magnetic, electric and dielectric properties of FeCo alloy nanoparticles dispersed in amorphous matrix. Phys. Status Solidi A 2010, 207, (11), 2505-2510.

Tondra, M.; Smith, C., Integrated detection of nanomagnetic bioassay labels. Proc. SPIE-Int. Soc. Opt. Eng. 2005, 5732, 417-425.

Van Roosbroeck, R.; Van Roy, W.; Stakenborg, T.; Trekker, J.; D'Hollander, A.; Dresselaers, T.; Himmelreich, U.; Lammertyn, J.; Lagae, L., Synthetic Antiferromagnetic Nanoparticles as Potential Contrast Agents in MRI. ACS Nano 2014, 8, (3), 2269-2278.

Vereda, F.; de Vicente, J.; Morales, M. d. P.; Rull, F.; Hidalgo-Álvarez, R., Synthesis and characterization of single-domain monocrystalline magnetite particles by oxidative aging of Fe (OH) 2. J. Phys. Chem. C 2008, 112, (15), 5843-5849.

Vestal, C. R.; Zhang, Z. J., Synthesis and magnetic characterization of Mn and Co spinel ferrite-silica nanoparticles with tunable magnetic core. Nano Lett. 2003, 3, (12), 1739-1743.

Vivero Escoto, J. L.; Rieter, W. J.; Lau, H.; Huxford Phillips, R. C.; Lin, W., Biodegradable Polysilsesquioxane Nanoparticles as Efficient Contrast Agents for Magnetic Resonance Imaging. Small 2013, 9, (20), 3523-3531.

Wang, J. N.; Zhang, L.; Yu, F.; Sheng, Z. M., Synthesis of Carbon Encapsulated Magnetic Nanoparticles with Giant Coercivity by a Spray Pyrolysis Approach. J. Phys. Chem. B 2007, 111, (8), 2119-2124.

Wang, W.; Wang, Y.; Tu, L.; Feng, Y.; Klein, T.; Wang, J.-P., Magnetoresistive performance and comparison of supermagnetic nanoparticles on giant magnetoresistive sensorbased detection system. Sci. Rep. 2014, 4, 1-5.

Wohlfarth, E., Relations between different modes of acquisition of the remanent magnetization of ferromagnetic particles. J. Appl. Phys. 1958, 29, (3), 595-596.

Wong, J. E.; Gaharwar, A. K.; Muller-Schulte, D.; Bahadur, D.; Richtering, W., Magnetic Nanoparticle-Polyelectrolyte Interaction: A Layered Approach for Biomedical Applications. J. Nanosci. Nanotechnol. 2008, 8, (8), 4033-4040.

Xu, C.; Sun, S., New forms of superparamagnetic nanoparticles for biomedical applications. Adv. Drug Delivery Rev. 2013, 65, (5), 732-743.

Xu, L.; Yang, L.; Luo, M.; Liang, X.; Wei, X.; Zhao, J.; Liu, H., Reduction of hexavalent chromium by Pannonibacter phragmitetus LSSE-09 coated with polyethylenimine-functionalized magnetic nanoparticles under alkaline conditions. J. Hazard. Mater. 2011, 189, (3), 1169-1175.

Yang, Y.; Liu, X.; Yang, Y.; Xiao, W.; Li, Z.; Xue, D.; Li, F.; Ding, J., Synthesis of nonstoichiometric zinc ferrite nanoparticles with extraordinary room temperature magnetism and their diverse applications. J. Mater. Chem. C 2013, 1, 2875-2885.

Yoon, T.-J.; Lee, W.; Oh, Y.-S.; Lee, J.-K., Magnetic nanoparticles as a catalyst vehicle for simple and easy recycling. New J. Chem. 2003, 27, (2), 227-229.

Yu, J.; Yi, B.; Xing, D.; Liu, F.; Shao, Z.; Fu, Y.; Zhang, H., Degradation mechanism of polystyrene sulfonic acid membrane and application of its composite membranes in fuel cells. Phys Chem Chem Phys 2003, 5, (3), 611-615.

Zeltner, M.; Grass, R. N.; Schaetz, A.; Bubenhofer, S. B.; Luechinger, N. A.; Stark, W. J., Stable dispersions of ferromagnetic carbon-coated metal nanoparticles: preparation via surface initiated atom transfer radical polymerization. J. Mater. Chem. 2012, 22, (24), 12064-12071.

Zeng, H.; Li, J.; Wang, Z. L.; Liu, J. P.; Sun, S., Interparticle interactions in annealed FePt nanoparticle assemblies. 2002, 2598-2600.

Zhang, M.; Earhart, C. M.; Ooi, C.; Wilson, R. J.; Tang, M.; Wang, S. X., Functionalization of high-moment magnetic nanodisks for cell manipulation and separation. Nano Res. 2013, 6, (10), 1-7.

Zhang, T.; Ge, J.; Hu, Y.; Yin, Y. A General Approach for Transferring Hydrophobic Nanocrystals into Water. Nano Lett. 2007, 7, 3203-3207.

Zhou, Y.; Tang, Z.; Shi, C.; Shi, S.; Qian, Z.; Zhou, S., Polyethylenimine functionalized magnetic nanoparticles as a potential non-viral vector for gene delivery. J. Mater. Sci.-Mater. Med. 2012, 23, (11), 2697-2708.

\* cited by examiner

DISCRETE MAGNETIC NANOPARTICLES

CROSS REFERENCE TO RELATED APPLICATIONS

This application claims the benefit of U.S. Provisional Patent Application Ser. No. 62/125,227, filed on Jan. 15, 2015, which is hereby incorporated by reference in its entirety for all of its teachings.

STATEMENT REGARDING FEDERALLY FUNDED RESEARCH

This invention was made with government support under CA151650 awarded by the National Institutes of Health. The government has certain rights in the invention.

FIELD OF INVENTION

The disclosure provided herein relates to discrete magnetic nanoparticles which are encapsulated in a manner to avoid spontaneous self-aggregation. Specifically, a magnetic core is covered with layers of polyelectrolyte and an exterior coating, and the resulting nanoparticles are at least about 100 nm in diameter.

BACKGROUND

The need to create encapsulated magnetic nanoparticles stems not only from the fact that the shell acts to reduce magnetic-induced self-aggregation, but also that the exterior layer can provide a surface amenable to in vivo use and can be conducive to functionalization with molecular recognition moieties (e.g., antibodies, peptides). However, the realization of encapsulated, high magnetic moment magnetic particles is challenging due to the strong interparticle attractive forces that exist during the coating procedure.

Herein is described a method to deposit a uniform coating around a high moment (m~$10^{-13}$ emu/particle) core, to provide a particle with a diameter of at least about 100 nm. By depositing multiple polyelectrolyte layers using a layer-by-layer (LbL) process and an exterior coating such as silica, around a magnetic core, a magnetic particle suspension can be stabilized, allowing for the preparation of discrete uniformly-coated individual magnetic particles. The polyelectrolyte layers increase the particle-particle closest approach distance and provide an increased surface charge, which in turn helps minimize magnetic dipole-induced aggregation. These results suggest that successful creation of discrete core-shell magnetic particles is only realized after depositing multiple polyelectrolyte layers. Without the intermediary polyelectrolyte layers, magnetic dipole-dipole and van der Waals interactions lead to the formation of linearly chained magnetic particles embedded in the exterior coating matrix. This encapsulation method can be used to easily and routinely prepare discrete coated magnetic nanoparticles for use in many biomedical applications.

SUMMARY

The present invention relates to nanoparticles made with a magnetic core particle which exhibits a magnetic moment of at least about $1.5 \times 10^{-13}$ emu, a plurality of layers, and an exterior coating. The present invention also provides methods for preparing a nanoparticle made with a magnetic core particle which exhibits a magnetic moment of at least about $1.5 \times 10^{-13}$ emu, a plurality of layers, and an exterior coating, where the method includes the steps of depositing a plurality of layers on the magnetic core particle, and depositing a coating on the exterior of the layer-coated particle.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings below are supplied in order to facilitate understanding of the Description and Examples provided herein.

DETAILED DESCRIPTION

Figure 1:
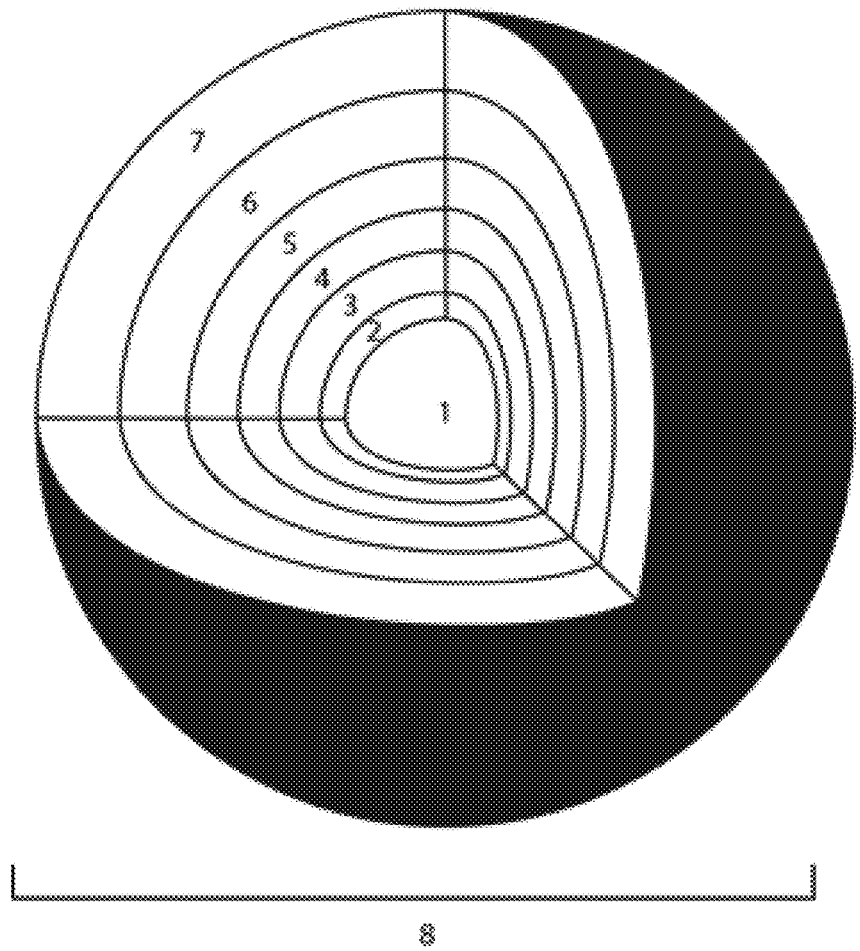
FIG. 1 is a schematic diagram of an exemplary magnetic nanoparticle.

The synthesis and preparation of magnetic nanoparticles (MNPs) with large magnetic dipole moments, m, have been useful in a variety of technologies, including those focused on magnetic recording media, biological and environmental separations, chemical catalysis, nanomedicine, ferrofluid applications, magnetic resonance imaging (MRI) contrast reagents, and biosensors. However, one of the shortcomings of high m MNPs is their tendency to spontaneously aggregate. Approaches to prevent MNP aggregation include creating a shell around the MNPs, fabricating synthetic antiferromagnetic nanoparticles, or decreasing the MNP size until superparamagnetic behavior is observed. Superparamagnetism (at 298 K) occurs in single-domain ferro- and ferrimagnetic nanoparticles of sufficiently small size that their magnetic dipole undergoes random thermal fluctuations in the absence of an external magnetic field (H); this situation results in the absence of an observable moment.

Despite the advantage of zero residual magnetism afforded by superparamagnetic nanoparticles (SPMNPs), the diminution in MNP size results in a commensurate decrease in m, which can limit utility. For example, the signal-to-noise ratio of a magnetic bio-sensor is proportional to m, and MNPs with large m are generally required in magnetic drug delivery and cell separation technologies. SPMNPs are also not suitable for permanent magnetic storage media, which require ferro- or ferri-magnetic nanoparticles (FMNPs) with nonzero coercivity (HO and remanent magnetization ($M_R$).

In addition to tailoring MNP size to counteract magnetic interparticle attraction, several particle-coating strategies have been used with similar results. Simple surface-ligand exchange has been used to effectively stabilize SPMNP dispersions. However, ligand-exchange does not mitigate the aggregation of FMNPs. In these cases, polymeric coatings have been employed to avoid magnetically induced aggregation during and after synthesis. The charged or polar groups of the polymer stabilize moderate m MNPs via electrostatic repulsion and the physical coating limits particle-particle approach distance. In instances of large m FMNPs, extraordinarily strong electrostatic repulsion or an increase in the MNP-MNP closest-approach induced by thicker polymeric coatings is necessary to produce a stable FMNP colloid. The effectiveness of these polymeric coatings, however, is generally limited to FMNPs smaller than 50 nm in size.

Another means to overcome magnetic-induced aggregation is to encapsulate MNPs in a shell of gold, graphite, or silica creating a core-shell architecture (core@shell). This form of encapsulation has several advantages over other coating strategies: 1) it can increase the MNP-MNP closest approach distance thereby reducing interparticle interactions; 2) it protects the magnetic core from dissolution; and 3) it can be modified with molecular recognition elements (e.g., antibodies, nucleic acids) by established linking chemistries.

Among those coating materials, silica is biocompatible and can further enhance colloidal stability in aqueous media since the terminal hydroxyl groups are ionized at the pH of physiologically relevant matrices. Although the application of silica coatings on small FMNPs has been reported, there are few reports detailing the encapsulation of large FMNPs with high m. In these scenarios, silica encapsulation often leads to aggregates of particles embedded in a silica matrix. While it appears that certain conventional intermediary coating procedures are sufficient to stabilize the particles prior to silica encapsulation, it is not clear that a high yield of single-core, silica-coated MNPs was realized. Generally, these methods are not effective in stabilizing >100 nm zinc ferrite nanocubes with a saturation magnetization ($M_s$) value of at least about 100 emu/g.

A schematic drawing of an exemplary magnetic nanoparticle is shown in FIG. 1. The core particle, labeled with number 1, may be magnetic. In certain embodiments, the core particle is magnetic and is comprised of at least one of magnetite ($Fe_3O_4$), maghemite ($\gamma$-$Fe_2O_3$), hematite ($\alpha$-$Fe_2O_3$), other ferrites (e.g., $CoFe_2O_4$, $MnFe_2O_4$, $NiFe_2O_4$, strontium ferrite, barium ferrite, manganese-zinc ferrite, etc.), metallic nanoparticles including Ni, Fe, Co, FeCo alloys, FePt alloys, FeS alloys, NiFe alloys, CoPt alloys, SmCo alloys, CeCo alloys, NdFeB alloys, Alnico, comol, hipernom, FeSi alloys, magnet steel (i.e. FeCCr alloys), chromindur, silmanal, vectolite, magnadur, or Iodex. In an embodiment, the core particle is a zinc ferrite nanocube (ZFNC).

The next layer, labeled with number 2, can be a layer of a ligand which encompasses the core particle. The layer may be hydrophilic or hydrophobic. In some embodiments, there is no ligand layer in the nanoparticle. In certain embodiments, there may be a plurality of ligand layers in the nanoparticle. In an embodiment, the hydrophilic layer comprises at least one of citric acid, dimercaptosuccinic acid, poly(ethyleneimine), poly(allylamine) or polystyrene sulfonate.

The next four layers, labeled with numbers 3-6, represent layers deposited using the LbL technique. Generally, these layers are polymeric, and may comprise polyelectrolytes.

In certain embodiments, there may be as few as one LbL layer, at least two LbL layers, at least six LbL layers, or as many as 20 LbL layers. In an embodiment, there is a plurality of layers. The plurality of layers may comprise polyelectrolytes, and may be made up of at least one polycationic layer and at least one polyanionic layer coupled to the polycationic layer.

The layers may comprise at least one of a polystyrene, a poly(allylamine), a poly(lysine), an alginate, hyaluronan, a poly(glutamic acid), a poly(lactic acid), a poly(acrylic acid), a poly(methacrylic acid), chitosan, a poly(ethylenimine), a diallyldimethylammonium halide, N-methyl-N-vinylacetamide, a poly(vinyl sulfate), a poly(vinyl sulfonate), a poly(3-thiophene acetic acid), a poly(maleic acid), or a poly(ethylene). In an embodiment, the layers are a plurality of layers which comprises at least one polycationic layer and at least one polyanionic layer, such as polystyrene sulfonate (PSS) and polyallylamine (PAAm). In certain embodiments, the plurality of layers is coupled to the hydrophilic layer, such as by electrostatic interactions.

The outermost layer, the exterior layer, is labeled with number 7 in FIG. 1, and represents a protective exterior coating for the nanoparticle. The entire nanoparticle is labeled with number 8, and can be described as core@LbL@coating. For example, a nanoparticle 8 may be described as a ZFNC@PSS/[PAAm,PSS]$_5$/PAAm@silica, which corresponds to a core particle of a zinc ferrite nanocube with a ligand layer of PSS, 11 polyelectrolyte layers deposited by the LbL technique, and an exterior silica coating. In some embodiments, the exterior layer comprises silica or titania, or it may comprise a combination of silica or titania. In an embodiment, the exterior layer comprises silica ($SiO_2$).

In certain embodiments, the nanoparticle is spherical, as depicted. In other embodiments, the nanoparticle may be cubic, ellipsoidal, dodecahedral or octahedral. The nanoparticle may contain layers with different shapes, such as a cubic core and an exterior shell which is spherical, with internal polyelectrolyte layers which change from generally cubic (near the core) to generally spherical (near the exterior shell).

The nanoparticle may have a size between about 100 nm and about 300 nm. In an embodiment, the nanoparticle has a size between about 100 nm and about 200 nm.

The layers within the nanoparticle may interact by a variety of forces, including, for example, electrostatic interactions, hydrophobic interactions, hydrogen bonding, charge-transfer interactions, host-guest interactions, biologically specific interactions, coordination chemistry interactions, covalent bonding, stereocomplexation, and surface sol-gel processes.

Herein is described a method for the production of discrete, silica-coated ferrimagnetic zinc ferrite nanocubes (ZFNCs). High-moment (m~$10^{13}$ emu/particle) ZFNC seeds (~130 and ~160 nm) were first prepared via thermal decomposition in benzyl ether and oleic acid. The resulting hydrophobic oleic acid surface-molecules of as-synthesized ZFNCs can be replaced with a hydrophilic ligand and transferred to aqueous media. To further increase the suspension stability of the seed ZFNCs, multiple layers of two alternating polyelectrolytes, polyallylamine (PAAm) and polystyrene sulfonate (PSS), were deposited by a layer-by-layer (LbL) process. The LbL-stabilized ZFNCs were then encapsulated with silica, resulting in primarily discrete silica-coated ZFNC (ZFNC@$SiO_2$) particles. The ZFNC@$SiO_2$ particles were characterized by electron microscopy, energy dispersive X-ray spectroscopy, powder X-ray diffraction, dynamic light scattering, infrared spectroscopy, and vibrating sample magnetometry.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items.

It also should be understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

It should be understood that, as used herein, the term "about" is synonymous with the term "approximately." Illustratively, the use of the term "about" indicates that a value includes values slightly outside the cited values. Variation may be due to conditions such as experimental error, manufacturing tolerances, variations in equilibrium conditions, and the like. In some embodiments, the term "about" includes the cited value plus or minus 10%. In all cases, where the term "about" has been used to describe a value, it should be appreciated that this disclosure also supports the exact value.

Reference throughout this specification to "one embodiment," "an embodiment," or similar language means that a particular feature, structure, or characteristic described in connection with the embodiment is included in at least one embodiment of the invention provided herein. Thus, appearances of the phrases "in one embodiment," "in an embodiment," and similar language throughout this specification may, but do not necessarily, all refer to the same embodiment.

Furthermore, the described features, structures, or characteristics of the methods, compositions, and kits provided herein may be combined in any suitable manner in one or more embodiments. In the following description, numerous specific details are provided, to provide a thorough understanding of embodiments. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the embodiments.

The compositions and methods disclosed herein demonstrate the potential for easily and routinely preparing discrete encapsulated magnetic nanoparticles for use in many biomedical applications, including in biological assays, for bioseparations and as biosensors.

EXAMPLES

Exemplary embodiments of the present disclosure are provided in the following examples. The examples are presented to illustrate the inventions disclosed herein and to assist one of ordinary skill in making and using the same. The examples and not intended in any way to otherwise limit the scope of the inventions disclosed herein.

The following abbreviations are used herein: MNP, magnetic nanoparticle; ZFNC, zinc ferrite nanocube; m, magnetic dipole moment; H, magnetic field; $H_{ext}$, external magnetic field; $M_c$, magnetization saturation; $M_R$, remanent magnetization; $H_C$, coercive field; IRM, isothermal remanent magnetization; DCD, dc demagnetization; $M_{IRM}(H)$, iso-thermal remanence magnetization; $M_{IRM}(\infty)$, isothermal saturation remanence magnetization; $M_{DCD}(H)$, DC remanence magnetization; $M_{DCD}(\infty)$, DC saturation remanence magnetization; TEOS, tetraethyl orthosilicate; EtOH, ethanol; DI $H_2O$, 18.2 MΩ-cm water; DMSO, dimethyl sulfoxide; PEI, polyethyleneimine; CA, citric acid; DMSA, dimercaptosuccinic acid; $NH_4OH$, ammonium hydroxide; PAAm, polyallylamine; PSS, polystyrene sulfonate; $M_w$, molecular weight; pI, isoelectric point; FESEM, field-emission scanning electron microscopy; EDX, energy dispersive x-ray; TEM, transmission electron microscopy; XRD, X-ray diffraction; UE, electrophoretic mobility; VSM, vibrating sample magnetometer; LbL, layer-by-layer; DLS, dynamic light scattering; SAF, synthetic antiferromagnetic nanoparticles; SPMNP, superparamagnetic nanoparticle; core@shell, core-shell particle architecture; and vdW, van der Waals.

Materials. Iron acetylacetonate (Fe(acac)$_3$, 99%), zinc acetyl-acetonate (Zn(acac)$_2$, 95%), benzyl ether (99%), tetraethyl orthosilicate (TEOS, 95%), dimercaptosuccinic acid (DMSA, 99%) and poly(sodium-p-styrene sulfonate) (PSS, linear, $M_w$~70,000 g/mol) were purchased from Acros Organics (USA). Polyethyleneimine (PEI, branched, $M_w$~25,000 g/mol) and citric acid (CA, 99%) were received from Sigma-Aldrich (USA). Polyallylamine hydrochloride (PAAm, linear, 120,000<$M_w$<200,000 g/mol), oleic acid (90%) and ammonium hydroxide (NH$_4$OH, 30%) were purchased from Alfa Aesar (USA). Ethanol (EtOH, 200 proof) was acquired from Decon Lab (USA). Dimethyl sulfoxide (DMSO, 99%) and toluene (99%) were obtained from Fisher Scientific (USA). All chemicals were used as-received without further purification.

Synthesis of Magnetic Nanoparticles. The synthesis of cubic ferrimagnetic core nanoparticles is as follows. To prepare the 130 nm particles, 0.353 g Fe(acac)$_3$ and 0.395 g Zn(acac)$_2$ were added to a mixture of 1.2 mL oleic acid and 10.0 mL benzyl ether. This solution was heated under nitrogen at a rate of 15° C./min to 290° C. and then refluxed for 30 min. After cooling to room temperature, 20 mL of EtOH was added to precipitate cubic zinc ferrite particles. The sample was then centrifuged at 10,190×g for 10 min and the supernatant was discarded. This washing procedure was repeated two more times. The MNPs were finally resuspended in 10 mL of toluene. For the 160 nm particles, the same procedure was used, but using 0.353 g Fe(acac)$_3$ and 0.198 g Zn(acac)$_2$.

Ligand-exchange of Magnetic Nanoparticles. Surface functionalization with a hydrophilic exchange ligand (i.e., CA, DMSA, PEI or PSS) was used to transform the as-prepared hydrophobic ZFNCs to a hydrophilic state for subsequent suspension in water. A 10 mL aliquot of ligand solution (ligand concentration ~70 mg/mL in DMSO) was added to the MNP suspension, followed by a 3-h sonication at 60° C. and agitation on a rocking table for 16 h. The hydrophilic, ligand-coated MNPs were next washed three times with 10 mL EtOH and resuspended in 18.2 Me-cm deionized water (DI H$_2$O). The final concentration of the ligand-exchanged MNPs was ~5 mg/mL.

In certain embodiments, no hydrophilic exchange ligand is included in the magnetic particles. In an embodiment, PEI is the hydrophilic exchange ligand. In a further embodiment, PSS is the hydrophilic exchange ligand.

Layer-by-layer (LbL) Deposition of Polyelectrolytes. Prior to LbL deposition, 1.0 mL of the PEI-coated zinc ferrite core particles (~5 mg) was diluted to 10 mL with DI H$_2$O. This step was followed by the addition of 5.0 mL aqueous PSS (10 mg/mL) and a 1-h sonication. Next, the excess PSS was centrifuged (10,190×g, 10 min) and decanted; the MNPs were then resuspended in 10 mL DI H$_2$O. This process was repeated two more times. A subsequent layer of PAAm was formed using the same procedure with an aqueous solution of PAAm (10 mg/mL). These two deposition steps were repeated until the desired number of polyelectrolyte layers were deposited prior to silica coating. The terminal PAAm layer possessed a net positive surface charge (—NH$_3^-$) in DI H$_2$O (pH=6.5). The resulting MNPs were resuspended in DI H$_2$O to a final concentration of ~5 mg/mL.

The same general procedure was used for the PSS-coated zinc ferrite core particles. Following the procedures described above, a sample of the 130 nm average diameter PEI-coated zinc ferrite core particles were encapsulated in alternating layers, for a total of 3 layers of PAAm and 3 layers of PSS, to provide a ZFNC@PEI/[PSS,PAAm]$_3$ magnetic particle. In a similar manner, a sample of the 160 nm average diameter PEI-coated zinc ferrite core particles was encapsulated with in a total of 7 layers of PAAm and 7 layers of PSS, to provide a ZFNC@PEI/[PSS,PAAm]$_7$ magnetic particle. Similarly, a sample of the 160 nm average diameter zinc ferrite core particles with a PSS hydrophilic layer was encapsulated in a total of 6 layers of PAAm and 5 layers of additional PSS, to provide a ZFNC@PSS/[PAAm,PSS]$_5$/PAAm magnetic particle.

These three samples of particles were coated with silica as described below, and are referred to as Examples 1-3, as summarized in the following table. The exterior coating is not included in the total number of layers listed in the last column.

| Example Number | Average Diameter of Core Particle | Ligand Layer | Polyelectrolyte Layers | Total Number of LbL Layers |
|---|---|---|---|---|
| 1 | 130 nm | PEI | [PSS,PAAm]$_3$ | 7 |
| 2 | 160 nm | PEI | [PSS,PAAm]$_7$ | 15 |
| 3 | 160 nm | PSS | [PSS,PAAm]$_5$PAAm | 12 |

Figure 2:
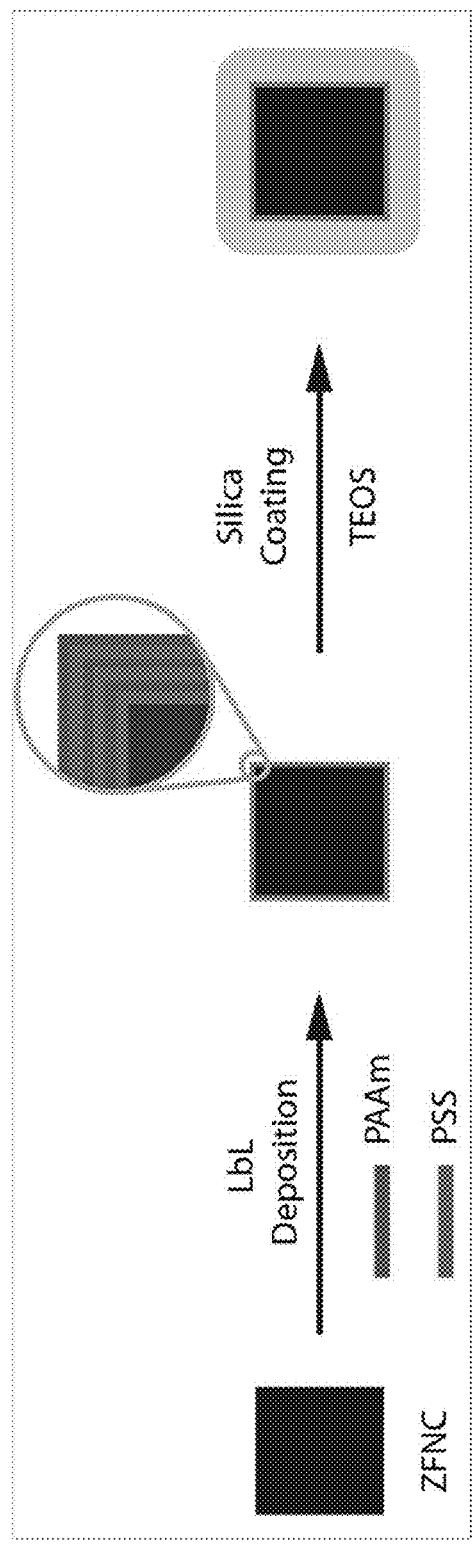
FIG. 2 is a schematic diagram showing the general process for synthesizing an exemplary magnetic nanoparticle.

Silica Coating. For either size of ZFNC core particles, silica was deposited on the polyelectrolyte-coated zinc ferrite core particles as follows. Briefly, 1.0 mL of the LbL-coated MNP suspension (~5 mg in DI H$_2$O) was added to 10 mL EtOH, followed by the sequential addition of 0.65 mL DI H$_2$O and 1.0 mL TEOS solution (25 µL/mL in EtOH) at room temperature. The magnetic suspension was sonicated for 90 min after which 0.98 mL NH$_4$OH was added drop-wise to the suspension with continued sonication. Then, another 1.0 mL of TEOS solution was added drop-wise, which was followed by a 90-min sonication, and then agitation on a rocker plate for 18 h. The silica-coated MNPs were isolated after three centrifugation (10,190×g, 10 min) steps in EtOH and a final resuspension in 10 mL DI H$_2$O. The general overall process is depicted in FIG. 2.

As used herein, the terminology used to describe intermediate particles during the process of making discrete nanoparticles, includes the inner layers unless otherwise noted. Thus, the terms ZFNC@PEI or ZFNC@PSS refer to a magnetic ZFNC core particle coated with at least one ligand layer of PEI or PSS. Similarly, the term ZFNC@LbL is understood to refer to a particle containing a magnetic ZFNC core particle coated with at least one ligand layer and also coated with at least one LbL layer, and the term ZFNC@SiO$_2$ is understood to refer to a particle containing a magnetic ZFNC core particle coated with at least one ligand layer and at least one LbL layer, in addition to an exterior coating of silica.

Electron Microscopy. Field-emission scanning electron microscopy (FESEM) was performed with a Hitachi S-4800 equipped with an energy dispersive X-ray (EDX, INCA, Oxford Instruments) spectroscopy module. In general, MNP samples for imaging and EDX analysis were prepared by pipetting 20 µL aqueous particle suspension onto a 1×1 cm silicon chip that was allowed to dry at ambient temperature. Images were obtained at an acceleration voltage of 15 kV.

For transmission electron microscopy (TEM), a JEM-2800 S/TEM instrument (JEOL, Japan) was used at 200 kV with the magnetic samples dropcast on a 3-mm carbon-coated copper grid. EDX mapping data was collected with a 1 nm probe at a 512×512 pixel density, ~0.5 nm/pixel.

X-ray Diffraction (XRD) Analysis. The crystallinity of the MNPs was determined by powder X-ray diffraction (XRD, Rigaku, D/max-2200V, Japan). XRD was carried out with Cu Kα radiation (λ=0.154059 nm) and operated at 40 kV and 30 mA. The diffractograms were obtained with a 2θ step of 0.02° at 0.5 s/step from 15°-100°. Three sample libraries, the International Centre for Diffraction Data (ICDD), the RUFF Project Database, and the National Bureau of Standards X-ray diffraction powder pattern monograph, were used for identification of samples.

Infrared (IR) Spectroscopy. IR transmission spectra were collected using a Nicolet Magna 850 Fourier transform IR spectrometer equipped with a liquid nitrogen-cooled mercury cadmium telluride detector. Spectra were collected in a nitrogen atmosphere using 512 scans at a resolution of 0.198 cm$^{-1}$ with p-polarized light. The MNP samples were prepared as 1% particle (w/w) dispersions in KBr.

Dynamic Light Scattering (DLS). The zeta (ζ)-potential and hydrodynamic sizes of particle samples were measured using a Zetasizer Nano (Malvern Instruments, U.K.) with a disposable folded capillary cell. The particles were diluted to 0.1 wt % in DI $H_2O$. Nanoparticle suspensions were sonicated for 2 min before being injected into the cell and left to equilibrate for 2 min prior to measurement. For hydrodynamic size measurements, the back-scattered mode was used at an angle of 174°. Diffusion coefficients of MNP samples were obtained by fitting the correlation function with the cumulants analysis algorithm. The Stokes-Einstein equation was then utilized to convert the diffusion coefficient to the hydrodynamic diameter. The measurement duration was set to 2 min and three measurements were made for each sample to quantify measurement reproducibility.

The Smoluchowski approximation was used to calculate the ζ-potential from the measured electrophoretic mobility of the particles ($U_E$), which is given as:

$$\zeta = \frac{\eta}{\varepsilon} U_E \qquad \text{Equation 1}$$

where η and ε are the viscosity and the dielectric constant of water (η=0.8872 cP and ε=78.5), respectively. The Smoluchowski approximation is applicable when the particle size is larger than the Debye length of the electrical double layer in a polar medium. The reported ζ-potential values are an average of three measurements per sample, where each measurement is an average of 15 sub-runs.

Remanent magnetization measurements. The interparticle interactions of magnetic samples were investigated by IRM and DCD. For the IRM analysis, samples were ac-demagnetized and then exposed to a magnetic field (H). The remanence magnetization, $M_{IRM}$(H), was measured at H=0. This cycle was repeated by increasing H to the point in which the saturation field, $H_{MAX}$, is reached ($H_{MAX}$=2,000 Oe for the ZFNC samples) and $M_{IRM}$(H) is the corresponding saturation value, $M_{IRM}$(∞). The DCD experiment was carried out in a similar manner, but the sample was first saturated at $-H_{MAX}$ and $M_{DCD}$(H) was obtained by stepping H in the opposite direction to $+H_{MAX}$. The $M_{DCD}$(H) measured at field saturation is termed $M_{DCD}$(∞). $H_{MAX}$ is the field at which saturation magnetization, $M_s$, of the specimen is reached.

The IRM and DCD data were used to construct Henkel and delta-m (δm) plots. These plots are generally used to examine the type and strength of interactions between magnetic particles. For an assembly of single-domain ferromagnetic particles with uniaxial anisotropy, the relationship between $M_{IRM}$(H) and $M_{DCD}$(H) is given by the Wohlfarth relation:

$$m_d(H)=(1-2m_r(H)) \qquad \text{Equation 2}$$

where $m_r$ and $m_d$ denote the reduced terms of $M_{IRM}$(H)/$M_{IRM}$(∞) and $M_{DCD}$(H)/$M_{DCD}$(∞) respectively. A method to assess the type of interactions (e.g., dipole-dipole) between particles consists of plotting $m_d$(H) vs. $m_r$(H), the so-called Henkel plot. In an assembly of non-interacting particles, the Henkel slope is -2 and is termed the Wohlfarth line.

Figure 3:
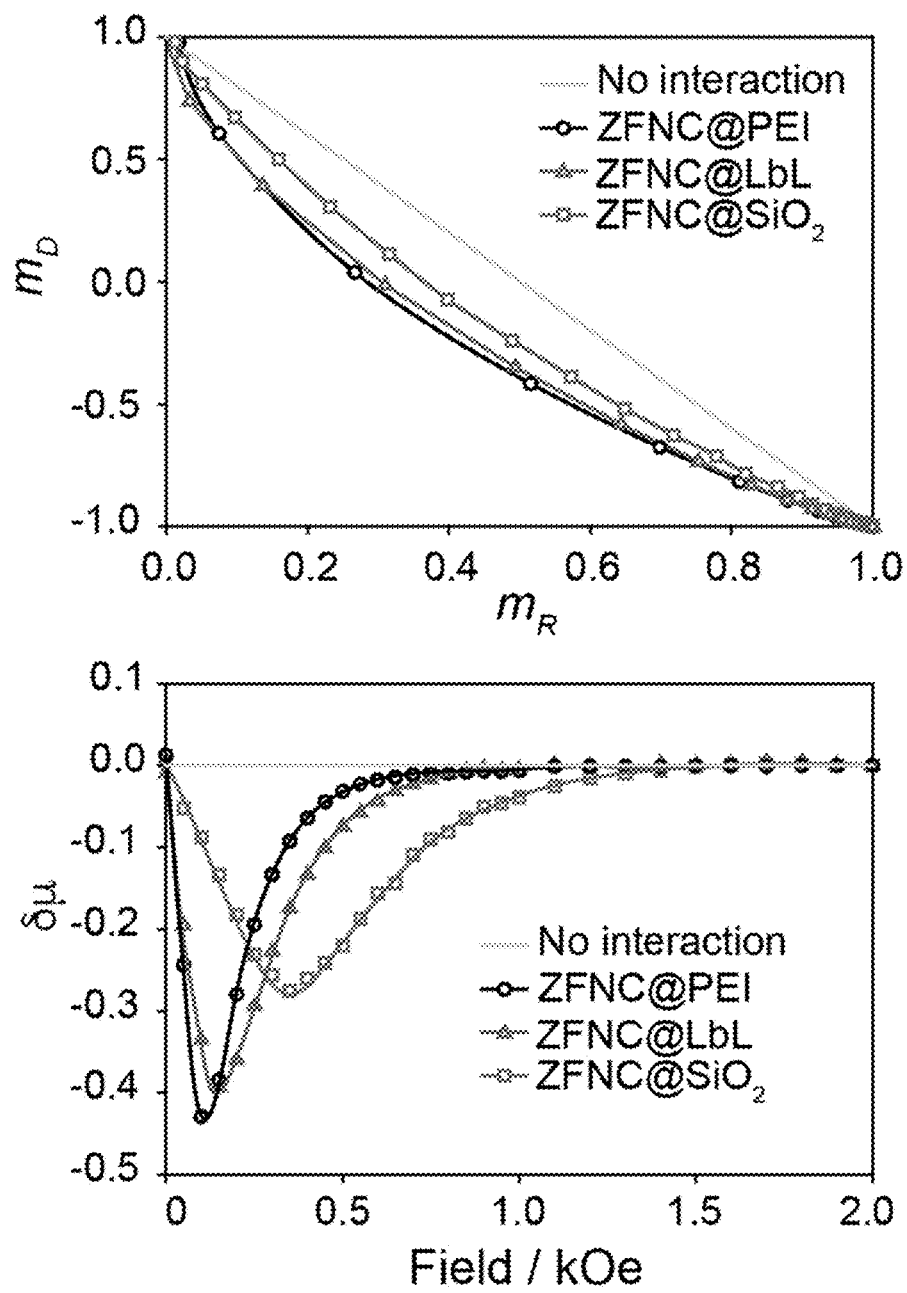
FIG. 3 shows a Henkel plot (upper graph) and a delta-m plot (lower graph) for exemplary nanoparticles.

The Henkel plot for the samples is shown in the upper graph of FIG. 3, and the Wolhfarth line is the line labeled "no interaction." The lower graph of FIG. 3 shows the corresponding delta-m values. The δm minima occur at 100, 150, and 350 Oe for the PEI-, LbL- and silica-coated ZFNCs, respectively. In both graphs of FIG. 3, data for the PEI-coated ZFNCs are shown with open circles, data for polyelectrolyte-coated ZFNCs is shown with open triangles, and data for ZFNC@$SiO_2$ (Example 1) is shown with open squares.

Negative deviations from the Wohlfarth line indicate that demagnetizing interactions predominate the system (e.g., dipole-dipole interaction that stabilize the demagnetized state), while a positive deviation is attributed to interactions promoting a magnetized state (e.g., interparticle super-exchange interactions or RKKY-like coupling). In order to retain field information, a further term, δm, was introduced into the relationship by Kelly et al.:

$$\delta m = m_d(H)-(1-2m_r(H)) \qquad \text{Equation 3}$$

where δm can conceptually be viewed to be twice the difference between the fraction of particles whose dipole orientation is switched at a particular field in IRM mode and DCD mode.

Vibrating Sample Magnetometry (VSM). Magnetic hysteresis curves, isothermal remanent magnetization (IRM), and dc demagnetization (DCD) remanence measurements were carried out using a vibrating sample magnetometer (VSM EZ7, MicroSense, Lowell, Mass.) operated at 298 K. For the measurements, MNPs were mounted on a piece of Kapton tape which was folded in half and gently compressed in a pellet press to fix the particles to the tape and remove trapped air. Another piece of the tape without the MNPs served as the blank. The signal of the blank was subtracted from the sample signal.

Herein, the convention of using the term magnetization M, interchangeably with mass magnetic moment σ, has been adopted. However, by definition, M has units of emu/$cm^3$ and σ has units of emu/g.

Figure 4:
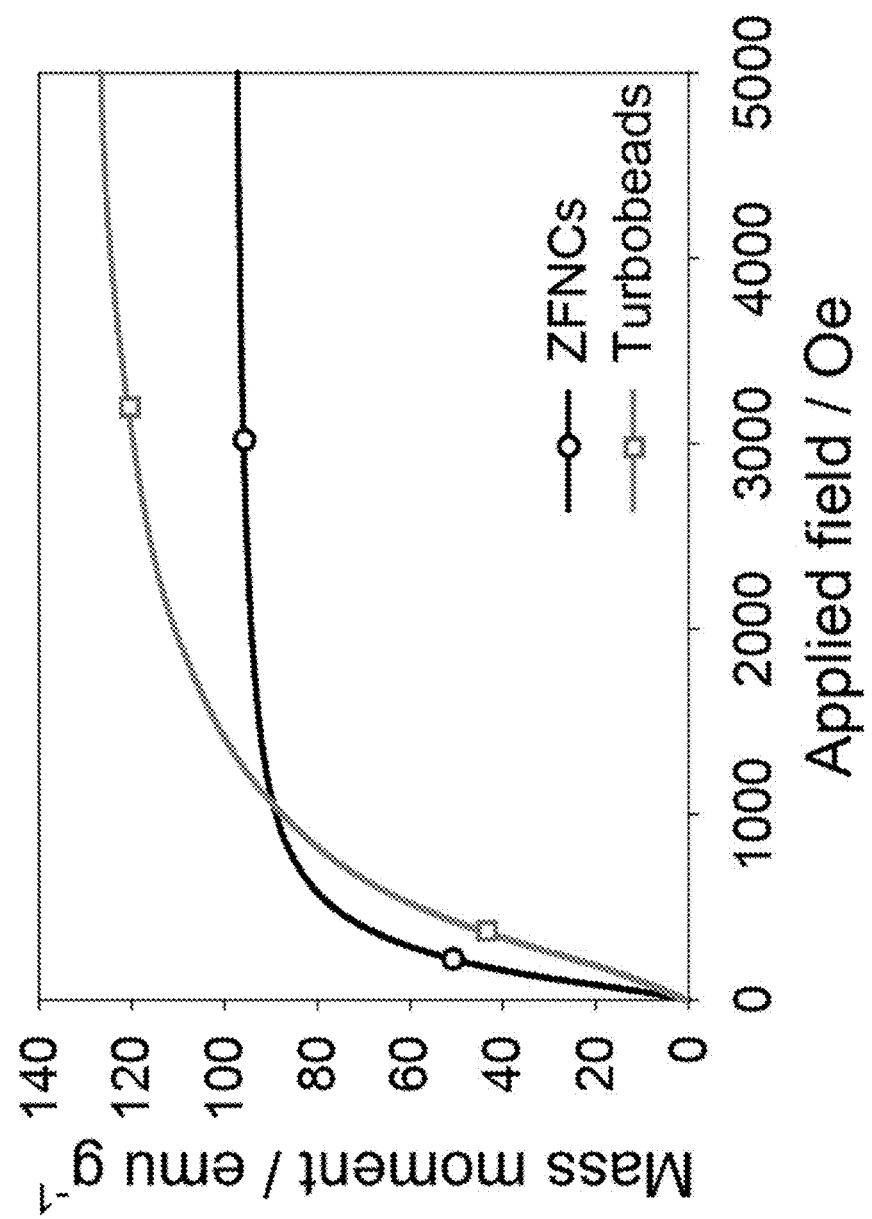
FIG. 4 shows the virgin magnetic curves for demagnetized samples for ZFNCs (open circles) and Turbobeads® metallic nanoparticles (open squares).

Virgin magnetic curves of demagnetized magnetic samples were measured by applying a magnetic field from 0 to 10,000 Oe. FIG. 4 shows the representative virgin curves of the ZFNCs (open circles; the line which plateaus at about 90 emu/g at 5000 Oe) and Turbobeads® metallic nanoparticles (open squares; the line which plateaus at about 120 emu/g at 5000 Oe). It is assumed that the mass of surface capping molecules are negligible compared to that of the MNPs and the densities of the ZFNCs and Turbobeads® metallic nanoparticles are equal to those of bulk magnetite and cobalt. Basis for the calculation of magnetic moment per particle is 1 g of the sample. For example, the calculation of magnetic moment per particle of the ZFNCs is described below.

Basis: 1 g of the MNPs. Average edge length of the MNPs: 129 nm=1.29×10$^{-7}$ cm. The volume of one cubic MNP can be calculated as:

$$V_{MNP}=L^3=(1.29\times10^{-7})^3=2.15\times10^{-15} \text{ cm}^3/\text{particle}$$

Density of the MNPs: 5.175 cm³. Total volume of the basis ($V_{total}$): 0.193 cm³.

The number of the ZNFCs in the basis can be calculated as:

$$N_{MNP,1g} = \frac{V_{total}}{V_{MNP}} = \frac{0.193 \text{ cm}^3}{2.15 \times 10^{-15} \text{ cm}^3/\text{particle}} = 9.00 \times 10^{13} \text{ particles}$$

The magnetic moment of one MNP at 150 Oe can be calculated as:

$$M_{150\,Oe} = \frac{m_{150\,Oe}}{N_{MNP,1g}} = \frac{37.7 \text{ emu}}{9.00 \times 10^{13} \text{ particles}} = 4.19 \times 10^{-13} \text{ emu/particle}$$

Comparison of particle sizes. Comparison of particle sizes measured using SEM and DLS are shown below in Table 1. The corner-to-corner length of particles was obtained by multiplying √3 to the edge length measured by SEM.

TABLE 1

Particle Sizes.

| | SEM | | DLS $D_{h,int}$ with |
|---|---|---|---|
| Size (nm) | 1 | 1 × √3 | FWHM |
| PEI-coated ZFNCs | 129 ± 15 | 224 ± 26 | 242 ± 80.2 |
| Polyelectrolyte-coated ZFNCs | N.A. | N.A. | 316 ± 120.1 |
| Silica-coated ZNFCs | 220 ± 17 | 381 ± 30 | 394 ± 126.5 |

Comparison of magnetic moment per particle. The magnetic moments per particle for different MNPs are shown below in Table 2. The values listed here, except for the values of Turbobeads® metallic nanoparticles and ZFNCs, are adapted from Wang et al.

TABLE 2

Magnetic Moments of Various Particles.

| Source | Catalog number | Size (nm) | $M_{30\,Oe}$ (emu) | $M_{150\,Oe}$ (emu) | $M_s$ (emu) |
|---|---|---|---|---|---|
| Ocean Nano-Tech | SHS-10 | 10 | 0.02 × 10⁻¹⁶ | — | 0.82 × 10⁻¹⁶ |
| Ocean Nano-Tech | SHS-20 | 20 | 1.1 × 10⁻¹⁶ | — | 7.8 × 10⁻¹⁶ |
| Ocean Nano-Tech | SHS-30 | 30 | 1.05 × 10⁻¹⁶ | — | 10.8 × 10⁻¹⁶ |
| Miltenyi Biotech | MACS 130-048-102 | 50 | 23 × 10⁻¹⁶ | — | 81 × 10⁻¹⁶ |
| Ademtech | ADM03210 | 100 | 18 × 10⁻¹⁶ | — | 368 × 10⁻¹⁶ |
| Turbobeads® metallic nanoparticles | Turbobeads® Carboxy | 30 | 4.06 × 10⁻¹⁶ | 19.7 × 10⁻¹⁶ | 1.63 × 10⁻¹⁴ |
| this disclosure | ZFNCs | 130 | 706 × 10⁻¹⁶ | 4.2 × 10⁻¹³ | 1.09 × 10⁻¹² |

Discussion. Monodispersed ZFNC core particles, also referred to as seed particles or seeds, were synthesized as described above by thermal decomposition of zinc and iron acetylacetonates, in two general sizes; those being (i) cubic particles with an average edge length of about 130 nm, referred to as the 130 nm core particles, and (ii) cubic particles with an average edge length of about 160 nm, referred to as the 160 nm core particles.

Figure 5:
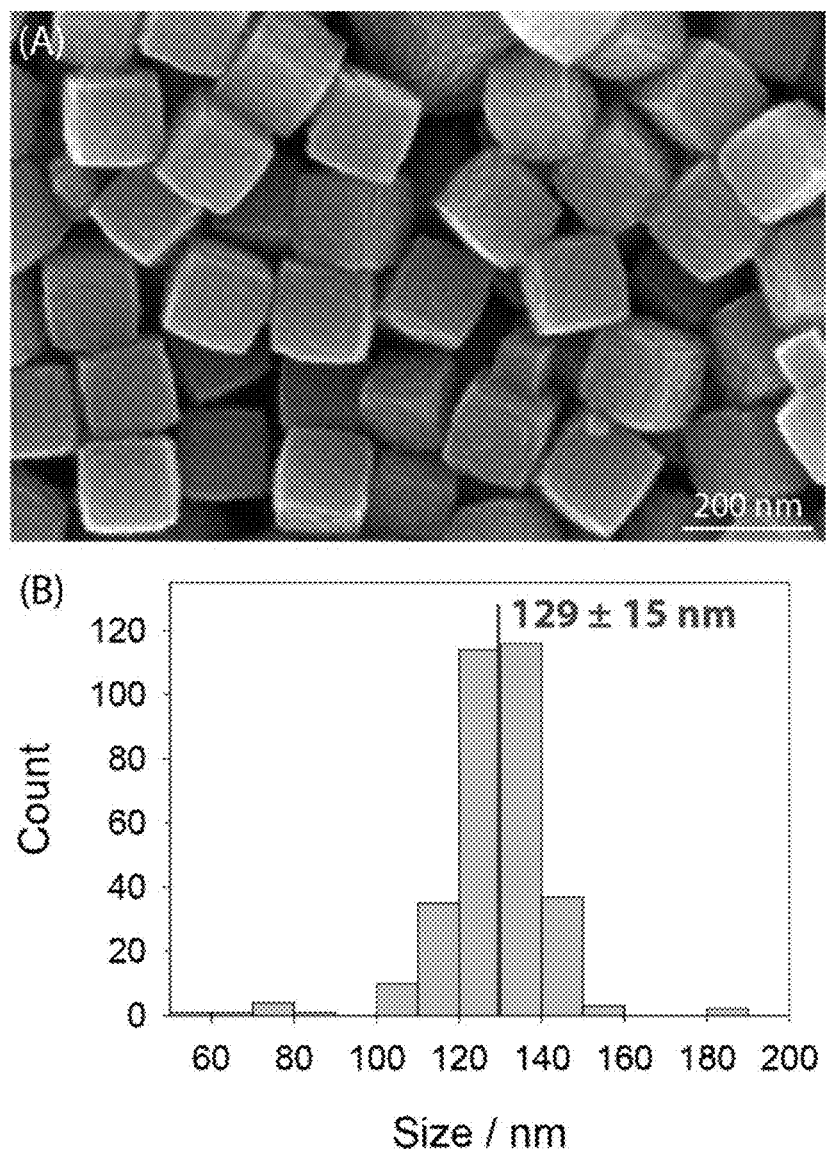
FIG. 5 shows a representative scanning electron micrograph (SEM) of exemplary 130 nm ZFNC core particles (upper portion) and a histogram of their edge length (lower portion).

Shown in the upper portion of FIG. 5 is a representative SEM image of the 130 nm ZFNCs, and shown in the lower portion of FIG. 5 is a graph of their size distribution. These cube-shaped particles have an average edge length of ~130 nm and their faces appear rough, which is usually found with particles larger than 100 nm and is most likely due to crystalline defects and step edges.

Figure 6A:
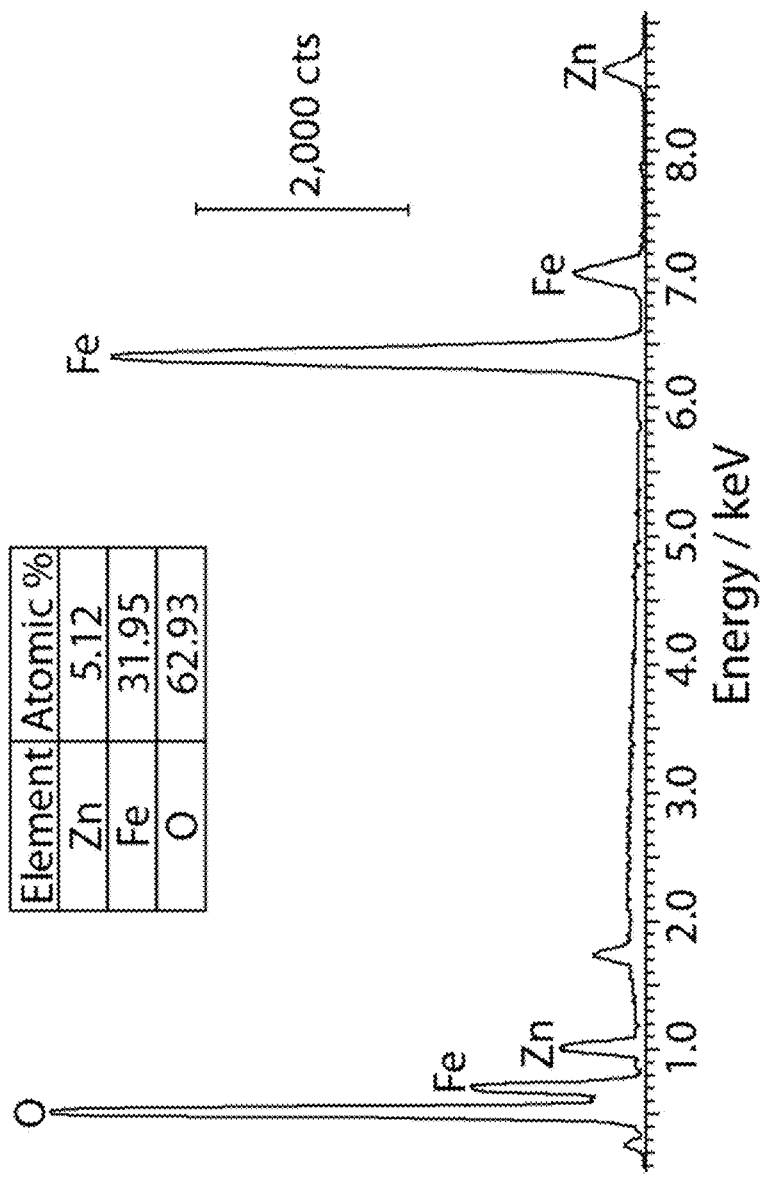
FIG. 6A shows the EDX spectrum of exemplary 130 nm ZFNC core particles.
Figure 6B:
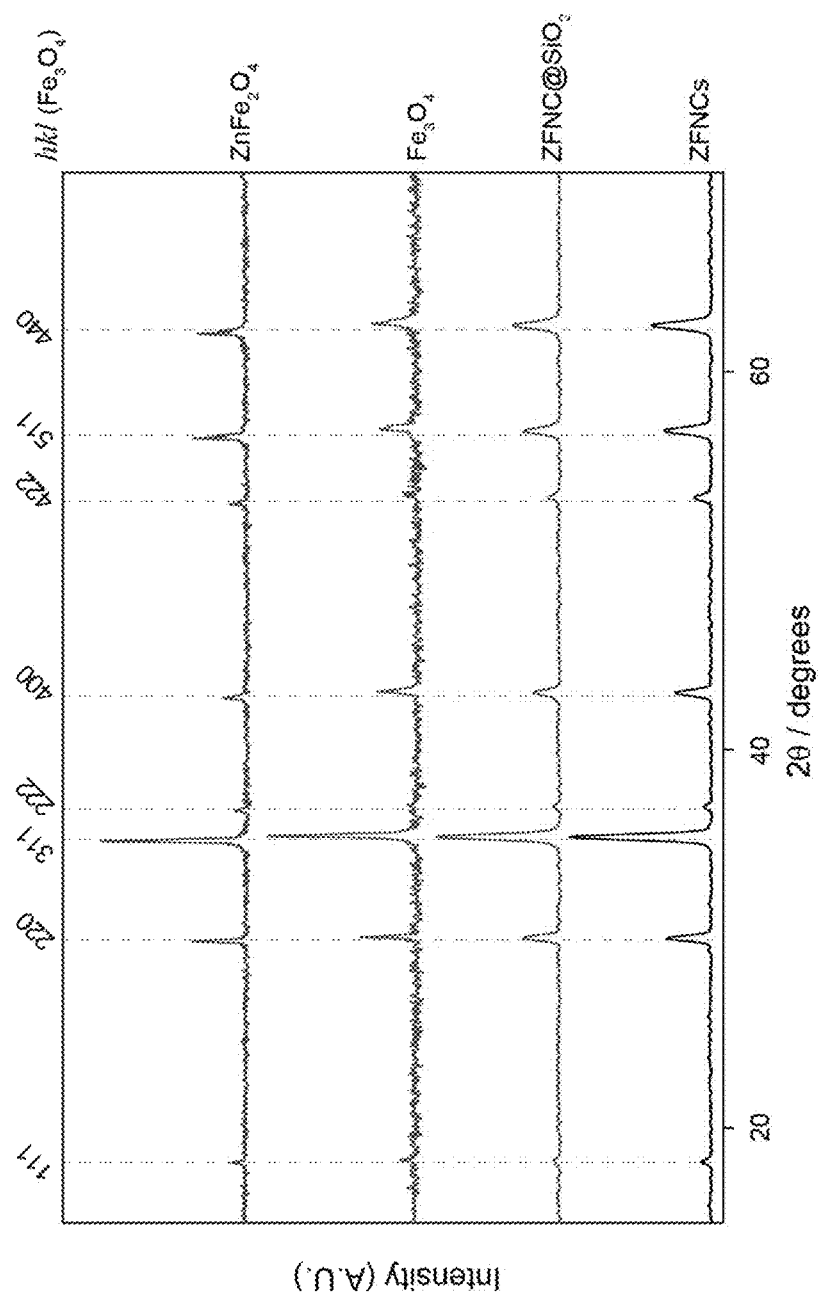
FIG. 6B shows the XRD diffractograms of exemplary 130 nm ZFNC core particles and silica-coated ZNFC particles.

The 130 nm core particles are composed of Fe, O, and Zn and have an empirical formula of $[Zn_{0.41}Fe_{0.59}]Fe_2O_4$ as determined by EDX, as shown in FIG. 6A. The X-ray powder diffractogram for the 130 nm ZFNCs is shown in FIG. 6B, which shows that the particles are crystalline with characteristic diffraction peaks of magnetite ($Fe_3O_4$, ICDD No. 01-086-0510 and RRUFF Database No. R080025) and zinc ferrite ($ZnFe_2O_4$, NBS Monograph and RRUFF Database No. R070137).

Figure 7A:
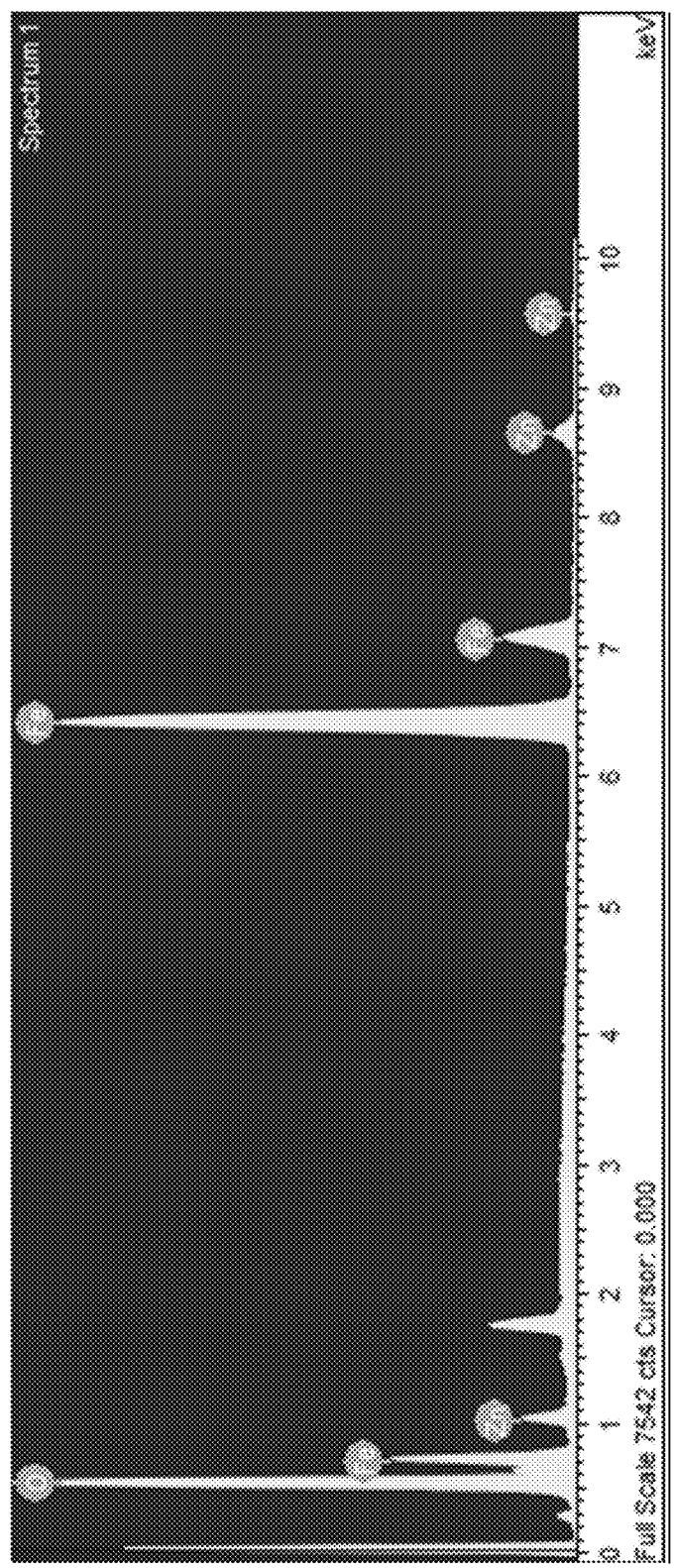
FIG. 7A shows the EDX data for exemplary 160 nm ZFNC core particles.
Figure 7B:
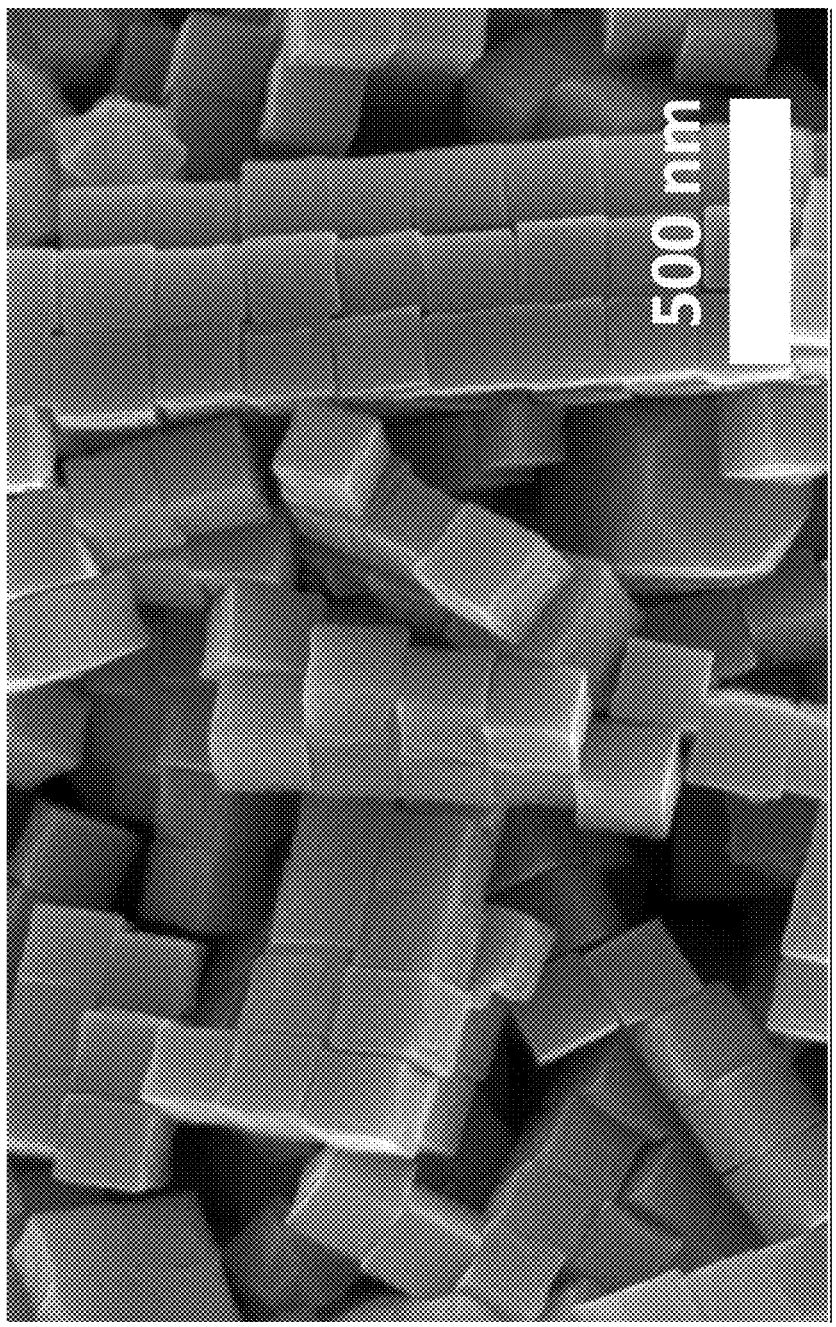
FIG. 7B is a representative SEM image of exemplary 160 nm ZFNC core particles.

The 160 nm particles are similar to the 130 nm particles in their general appearance. EDX analysis, however, showed that the 160 nm core ZFNCs are composed of Fe, O, and Zn with a different composition than the 130 nm core particles. The elemental percentages of Zn, Fe, and O were 2.94, 33.53, and 63.53, respectively, for the 160 nm core particles. An empirical formula of $[Zn_{0.25}Fe_{0.75}]Fe_2O_4$ for the 160 nm ZFNCs is estimated by EDX. FIG. 7A shows the EDX data for the 160 nm ZFNC core particles, and FIG. 7B is a representative SEM image of the 160 nm ZFNC core particles.

The ZFNCs can undergo a ligand-exchange process to replace the hydrophobic surface group, oleic acid, with a hydrophilic species. The following ligands were studied in detail: CA, DMSA, and branched PEI, based on their demonstrated effectiveness as ligand exchange agents. Polystyrene sulfonate (PSS) can also serve as a hydrophilic ligand in this regard, as well as a polyelectrolyte LbL layer (i.e., as described in FIG. 1).

Figure 8:
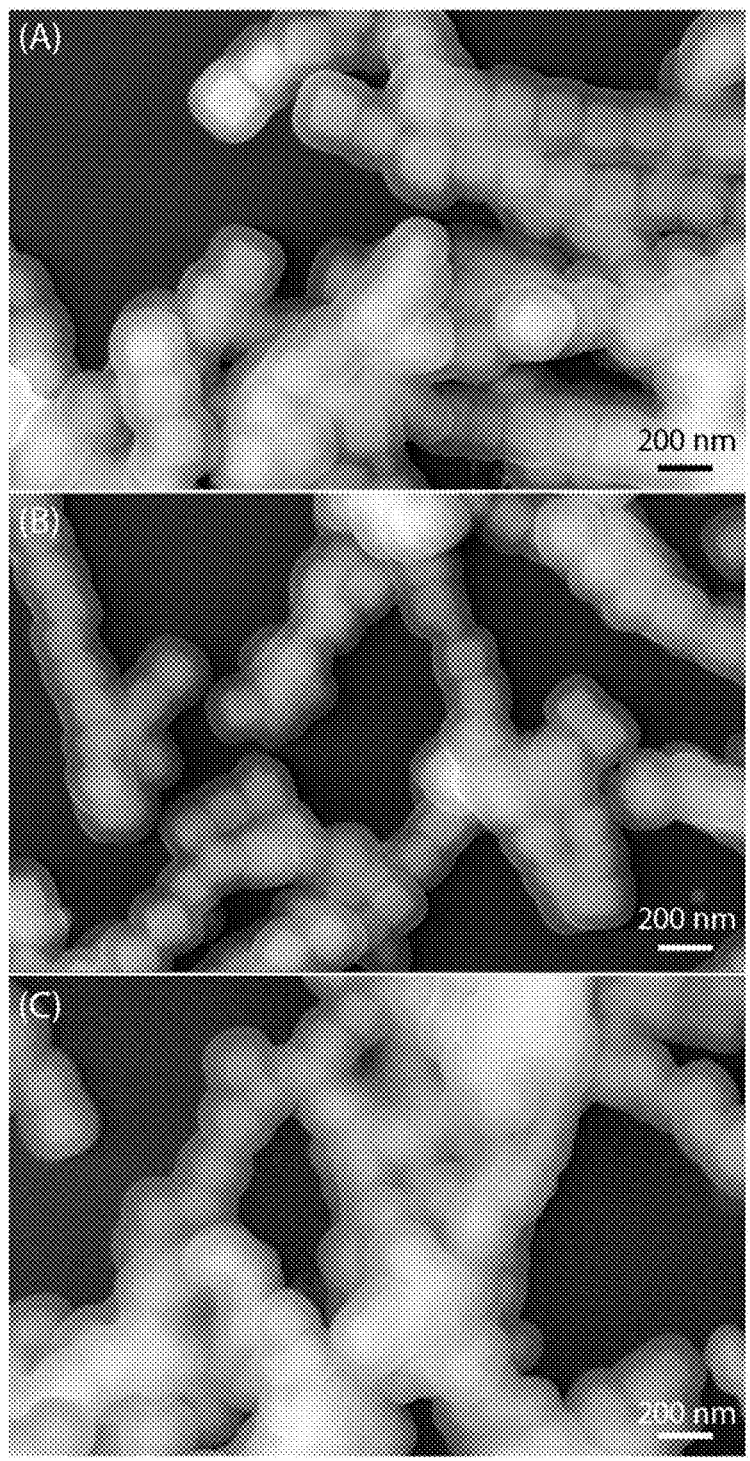
FIG. 8 shows SEMs of exemplary ZFNC core particles ligand-exchanged with CA (upper micrograph), DMSA (middle micrograph), or branched PEI (lower micrograph) prior to the silica coating step.

FIG. 8 shows scanning electron micrographs of the linear arrangement of ZFNCs in silica matrices. The 130 nm ZFNCs were ligand-exchanged with (A) CA, shown in the upper micrograph; (B) DMSA, shown in the middle micrograph; and (C) branched PEI, shown in the lower micrograph, before being encapsulated with the silica coating.

The ζ-potential values, which are an indication of surface charge and, therefore, colloidal stability, measured for the CA-, DMSA-, and PEI-coated 130 nm ZFNCs were −6.5±3.6, −15.9±4.6, and +52.7±4.4 mV, respectively, in DI H₂O. The negative values for the first two systems are consistent with the deprotonation of the carboxylic acid groups of CA and DMSA, whereas the positive value for the third system follows the expectation for protonation of the PEI amine groups. Of the three ligand-exchanged ZFNCs, only the PEI-coated ZFNCs appear to have an absolute ζ-potential indicative of stable colloids (|ζ|>30 mV). Indeed, when the CA- and DMSA-coated ZFNCs were suspended in DI H₂O, they precipitated within 10 min. The PEI-coated ZFNCs, however, remained suspended in DI H₂O for a few hours. The colloidal stability due to PEI, compared to CA and DMSA, is believed to arise from: 1) the multivalent adsorption of the polymer, leading to stronger particle-polymer interactions compared to the adsorption of mono- or divalent ligands, and 2) an increase in MNP-MNP separation due to PEI-induced steric hindrance and electrostatic repulsion of the profuse protonated amine groups. The ligand-exchange procedures appeared to have no effect on the morphology of seed ZFNCs, as confirmed by SEM.

Once the ZFNCs were stabilized with PEI and effectively dispersed in aqueous media, silica encapsulation was performed to create a potentially more suitable species for bioanalytical applications. Coating nanoparticles that possess a nonzero remanent magnetization with silica or metals can be problematic due to their tendency to aggregate, which is brought on by strong interparticle magnetic dipole-dipole interactions.

As shown in FIG. 8, while a one-step ligand exchange successfully altered the surface properties of the ZFNCs (i.e., from hydrophobic to hydrophilic), the particles tended to aggregate into linear chains during silica encapsulation. Individual ZFNC@SiO$_2$ particles were not observed; rather, linear aggregates of ZFNCs embedded in the silica matrix were formed. It is important to note that the high ζ-potential of the PEI-coated ZFNCs, indicating strong electrostatic repulsion between PEI-modified ZFNCs, did not prevent the seed ZFNCs from aggregating during the silica coating procedure. It is suspected that the linear arrangement of particles arises primarily from the intrinsic dipole-dipole moment alignment of the ferrimagnetic nanoparticles. In addition, the large contact area of the cubes may result in stronger van der Waals (vdW) attraction between the planar surfaces of the cubes compared to spherical particles, which may also play a role in the observed linear formation.

To prevent linear chain formation of the ZFNC seeds, a series of polyelectrolyte layers were applied to the seed ZFNCs using an LbL technique. The LbL deposition of polyelectrolytes is a versatile method and can be used to create robust, polymeric multilayer structures. In principle, fabrication of polyelectrolyte multilayers utilizes electrostatic interactions between oppositely charged polyelectrolytes, which enables cyclic deposition of oppositely charged polyelectrolytes. As a consequence, LbL deposition enables one not only to control the thickness of multilayers in nanometer scale, but also to take advantage of the polyelectrolyte charge. Of the potential polyelectrolytes, the utility of PSS and PAAm was assessed, which contain sulfonate and amine groups, respectively.

As the PEI-coated seed ZFNCs were positively charged, PSS was deposited as the first polyelectrolyte, followed by the deposition of PAAm. This cycle was repeated until the desired number of polyelectrolyte layers were deposited, such as six, ten, or fourteen polyelectrolyte layers. For the PSS-coated seed ZFNCs, PAAm was used as the first polyelectrolyte layer deposited.

Figure 9:
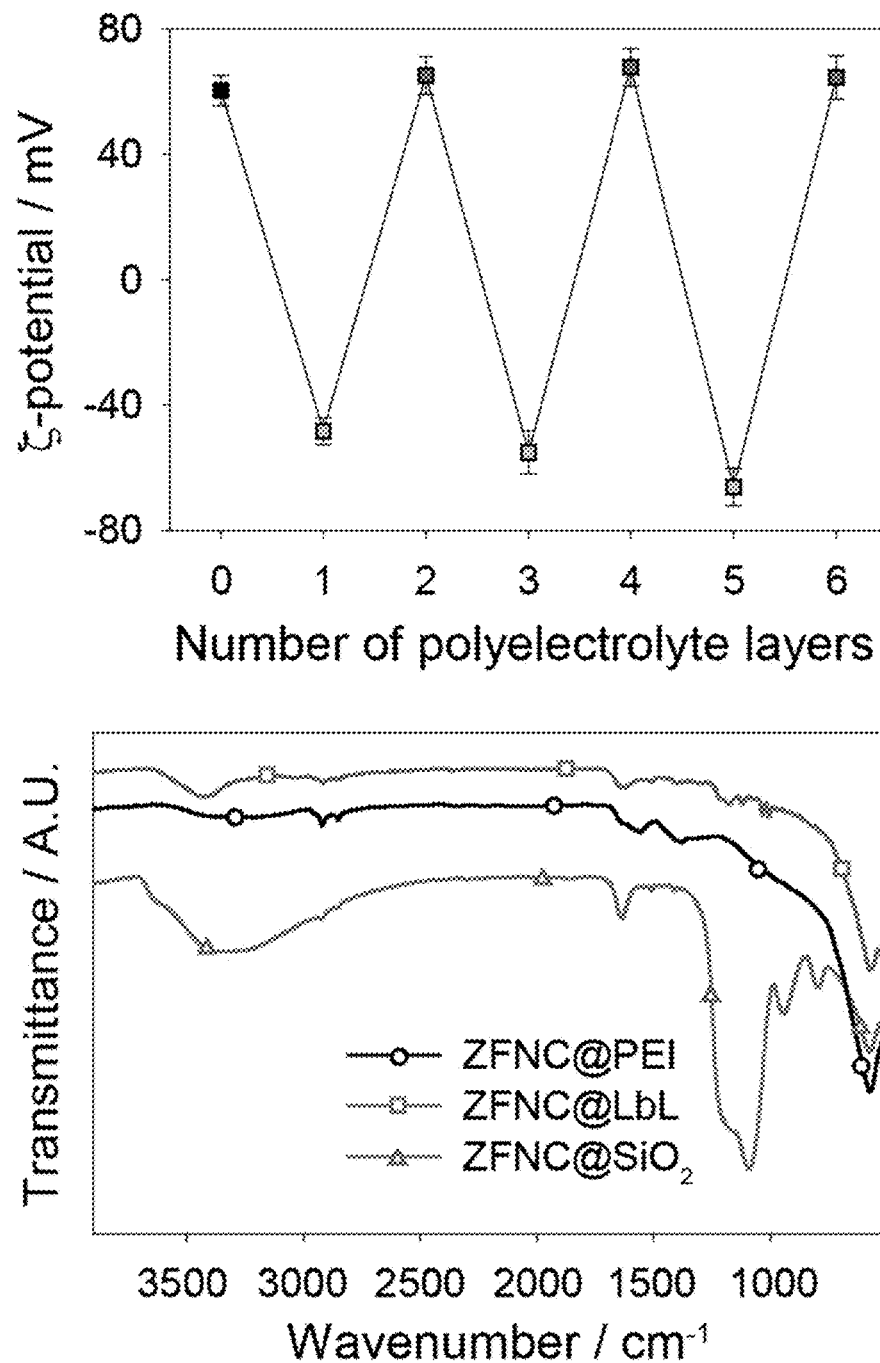
FIG. 9 shows a plot of the ζ-potential (upper graph) in the course of an exemplary LbL deposition process, and the IR spectra (lower graph) of exemplary particles after the ligand-exchange step (open circles), the LbL process (open squares), and silica encapsulation step (open triangles).

The deposition of each polyelectrolyte layer for the 130 nm core ZFNC with a total of twelve polyelectrolyte layers (Example 1) was characterized by ζ-potential and IR, as shown in FIG. 9. In the upper graph of FIG. 9, the charge reversal between PSS layers (odd numbered) and PAAm terminal layers (even numbered) indicates that the sequential deposition of polyelectrolytes was successful. The IR spectra shown in the bottom portion of FIG. 9 follow the stepwise formation of ZNFC@SiO$_2$, starting with the PEI-coated ZFNCs (open circles), going through the LbL process (open squares), and after silica encapsulation (open triangles).

The ζ-potential measurements show the surface charge reversal of the ZFNC seeds in the course of LbL deposition of PSS (odd layer number) and PAAm (even layer number). Note that the particle sample of ZFNC@LbL used in the IR study had six polyelectrolyte layers and a 130 nm cubic ZFNC core.

All three IR spectra have strong bands around 580 cm$^{-1}$, which are associated with Fe—O lattice vibrations. The features at 1560 and 1630 cm$^{-1}$ in the PEI-coated ZFNC sample are due to the NH and NH$_2$ deformation in PEI, and the broad band from 3200 to 3425 cm$^{-1}$ is assigned to the N—H stretching vibration. These spectral features confirm the presence of PEI after ligand-exchange. After depositing the six polyelectrolyte layers (upper trace), sharp bands at 1007 and 1037 cm$^{-1}$ are observed and attributed to the S=O symmetrical stretching vibration and an aromatic in-plane vibration of PSS, respectively. There is also a band around 1630 cm$^{-1}$, which is a bending mode of the primary amine in the PAAm layers. The progression of spectral features supports the successful deposition of PSS and PAAm polyelectrolyte layers on the ZFNC particles.

Figure 10:
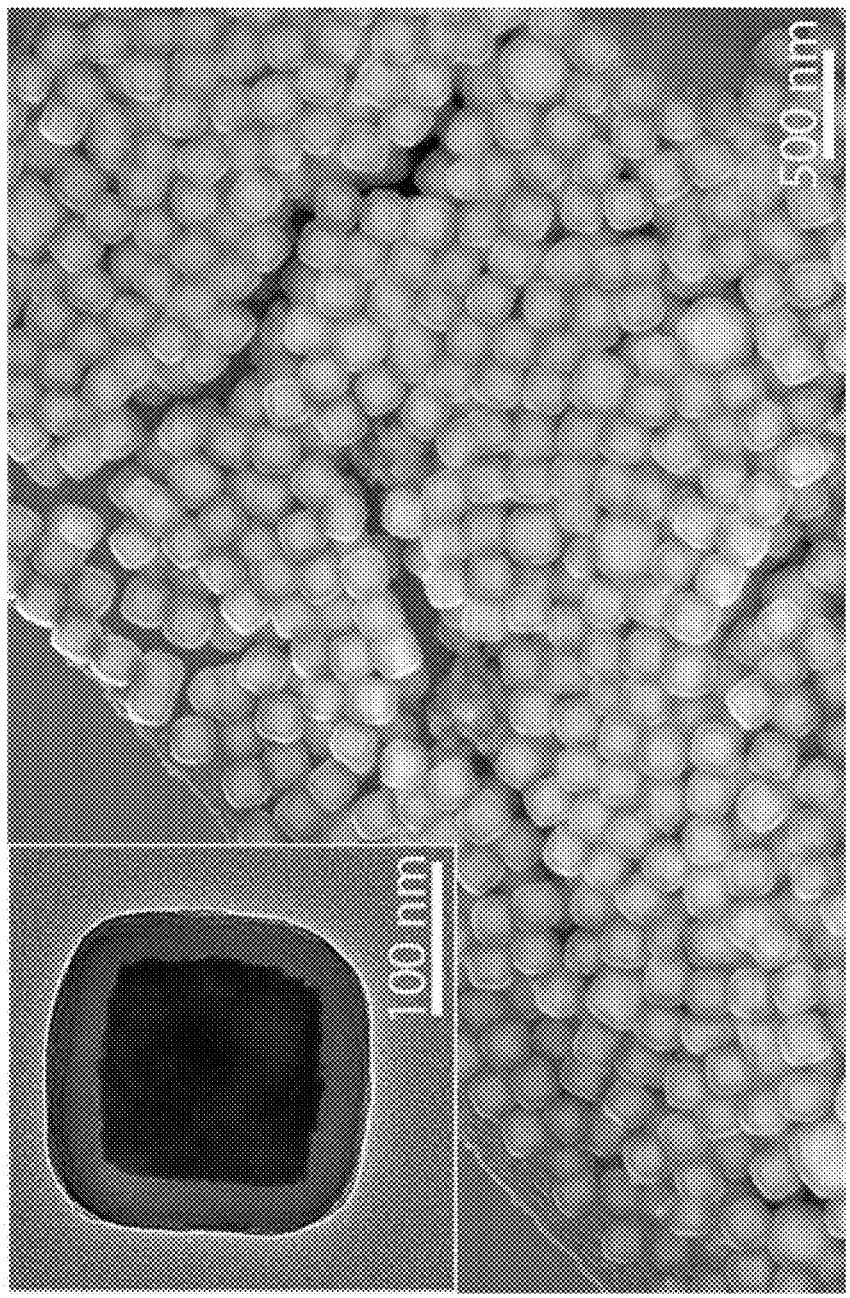
FIG. 10 shows a representative SEM of exemplary particles after LbL and silica encapsulation (large image), and a bright field TEM image at a higher magnification (inset image).

Discrete ZFNC@SiO$_2$ particles were subsequently fabricated after the LbL deposition, followed by a modified Stöber method. The thickness of the silica layer was found to be typically ~30 nm and the particles retained their cubic morphology, as seen in FIG. 10. In FIG. 10, the SEM image of the particles is shown in the larger image, and the inset image is a bright field TEM image at a higher magnification. The discrete nature of the ZFNC@SiO$_2$ particles is observed by noting the distance increase in MNP-MNP separation due to PEI-induced steric hindrance and electrostatic repulsion of the profuse protonated amine groups. The PSS ligand is expected to behave similarly.

The distance between particles is twice the thickness of the silica shell. The IR spectrum of the silica-coated ZFNCs (the lowest trace in the bottom portion of FIG. 9) shows a broad, strong band at 1100 cm$^{-1}$, which arises from the asymmetric vibration of Si—O bonds. Strong asymmetric and symmetric vibrations of Si—OH and Si—O are observed at 950 and 795 cm$^{-1}$, respectively. A broad band at 3500 cm$^{-1}$ and a slightly weaker band around 1600 cm$_{-1}$ are attributed to O—H stretching and bending vibrations, respectively; these two bands are likely from surface hydroxyl (—OH) groups of silica and adsorbed water. The measured ζ-potential of the ZFNC@SiO$_2$ particles in DI H$_2$O was −63.1±7.0 mV, indicating that the surface (—OH) groups are deprotonated, which is consistent with pI of silica (~pH 2). It should be noted that the XRD peaks of the silica-coated ZNFCs closely resemble the Bragg reflections of the seed ZFNCs (FIG. 7), indicating that the silica shell is amorphous and the crystallinity of the magnetic core is not affected by encapsulation.

Figure 11:
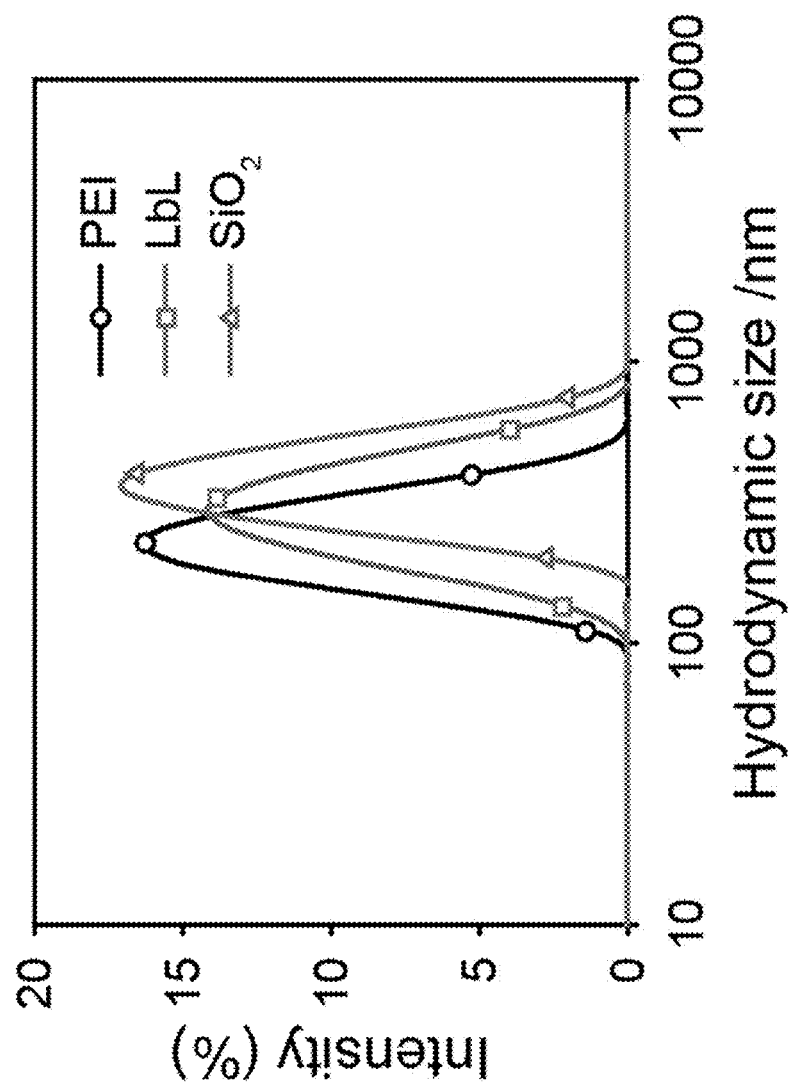
FIG. 11 is a graph of the particle size distributions for exemplary particles after the PEI step (open circles), the LbL process (open squares), and the silica encapsulation step (open triangles).

The particle size progression of the PEI-, polyelectrolyte-, and silica-coated ZFNCs was also followed by DLS, as shown in FIG. 11, and compared to the SEM micrograph analysis (Table 1). FIG. 11 shows the particle size distributions for PEI- (open circles), multiple LbL-(open squares), and silica-coated (open triangles) ZFNCs. As shown, the average size of the particle increases with the number of synthesis steps.

The hydrodynamic size based on intensity distribution ($D_{h,int}$) of the PEI-coated 130 nm ZFNCs was ~225 nm prior to LbL deposition. After the sequential deposition of six polyelectrolyte layers and silica coating, $D_{i,int}$ increased to 297 nm and 360 nm, respectively. Considering a sphere is the only object whose size can be correctly described by a single dimension in DLS, the $D_{h,int}$ of a cube is roughly interpreted as the maximum corner-to-corner dimension of that cube ($\sqrt{3}$ longer than a cube edge). Therefore, the hydrodynamic size intensity distributions of the ZFNC@SiO$_2$ from the DLS measurements are consistent with those determined from SEM (Table 1).

Figure 12:
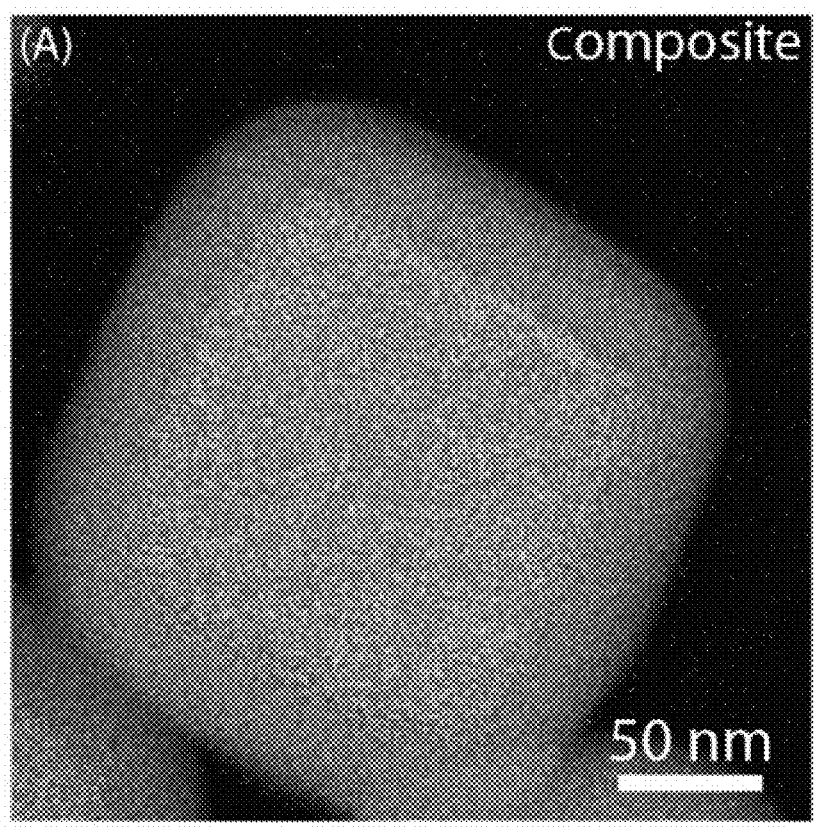
FIG. 12 is composite EDX image of the greyscale TEM image and the Fe, Si, and S distribution images shown in FIG. 13.
Figure 13:
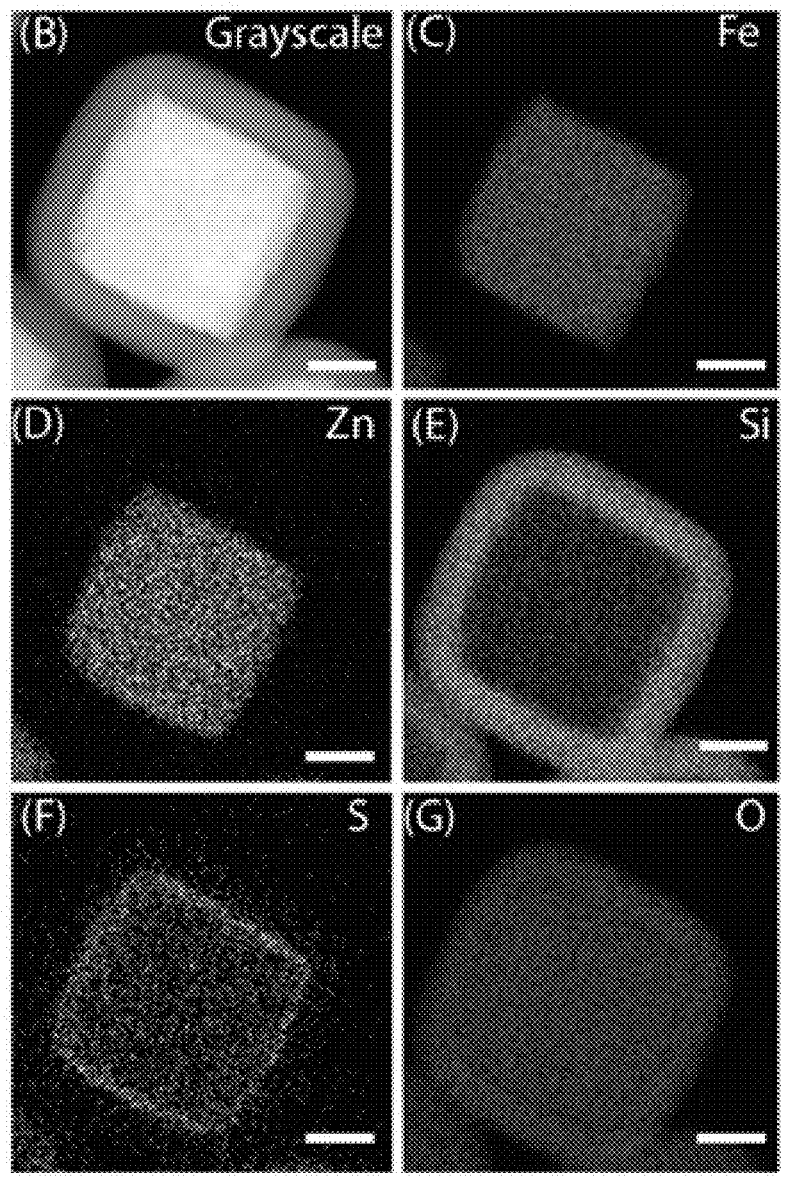
FIG. 13 shows the EDX images depicting the Fe (upper right), Zn (middle left), Si (middle right), S (lower left) and O (lower right) elemental distribution, with a greyscale TEM image in the upper left, of an exemplary nanoparticle.

EDX mapping analysis acquired during the course of TEM imaging provided chemical composition and elemental distribution information of discrete ZFNC@SiO$_2$ particles. Representative results are presented in FIG. 12 and FIG. 13. FIG. 12 is a composite EDX image of the greyscale TEM image and the Fe, Si, and S distribution images shown in FIG. 13. FIG. 13 show the EDX images depicting the Fe (upper right), Zn (middle left), Si (middle right), S (lower left) and O (lower right) elemental distribution, with a greyscale TEM image in the upper left.

The images indicate that Fe, Zn, and O are distributed throughout the particle core and the distribution of Si and S is weighted towards the encapsulating shell. It is important to note that polyelectrolyte layers deposited prior to silica encapsulation persist after silica coating. The S signal is presumed to be due to the presence of PSS between the core and the SiO$_2$ shell, which is clearly observed in FIG. 12—the composite of grayscale, Fe, Si, and S. The ability to capture intermediary components between the core and silica shell suggests that much smaller nanoparticles, fluorophores, or other materials could potentially be incorporated within the polyelectrolyte layers, creating multifunctional silica-coated ferrimagnetic nanoparticles. For example, by incorporating quantum dots within the multilayer polyelectrolyte structure, further development of multi-modal imaging and theranostic agents could be realized.

Figure 14:
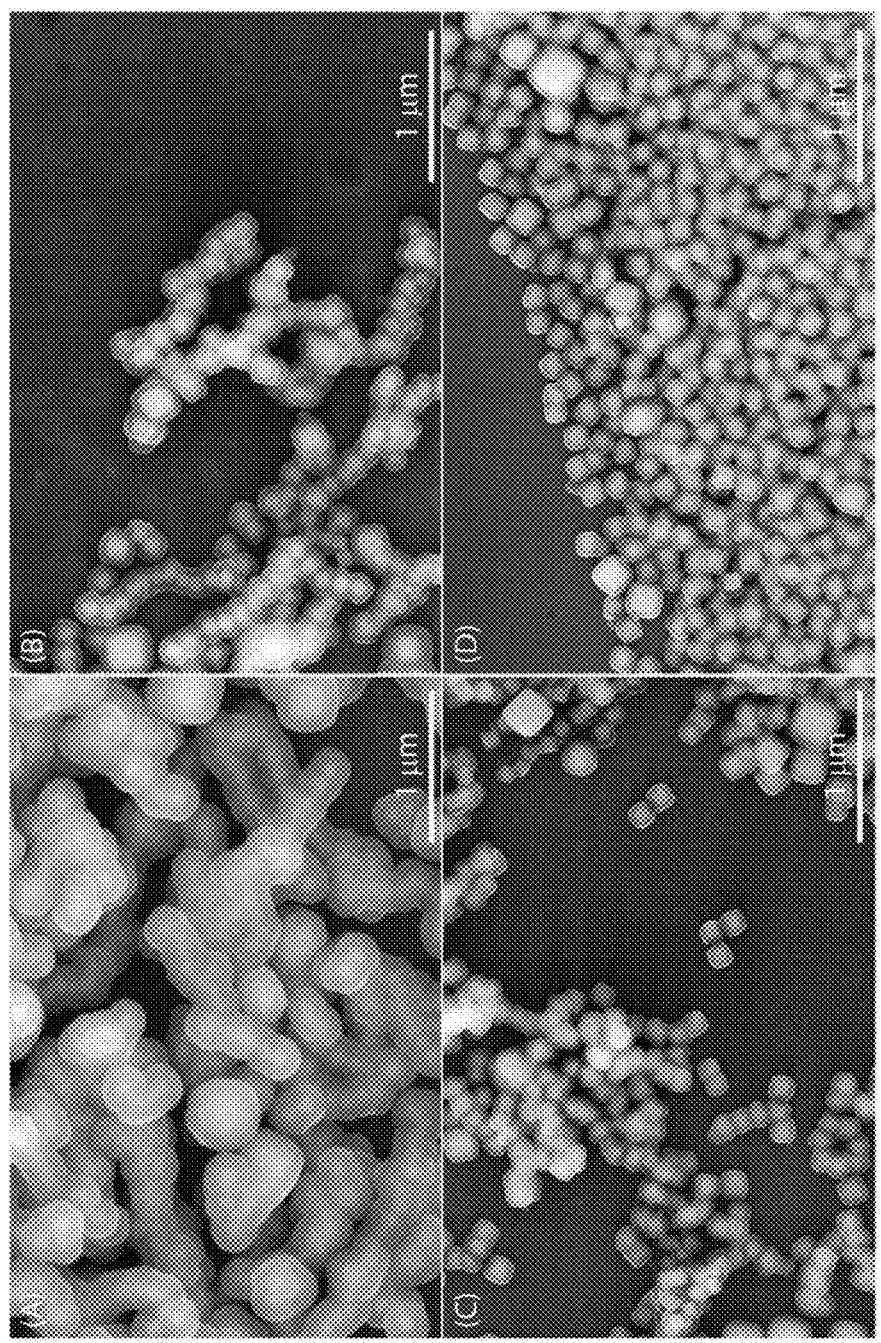
FIG. 14 shows SEM images of exemplary nanoparticles having zero (upper left), two (upper right), four (lower left), and six (lower right) polyelectrolyte layers.

To delineate the effect that the number of polyelectrolyte layers has on the formation of ZFNC@SiO$_2$ particles, an exterior silica coating was added the seed particles with different numbers of polyelectrolyte layers. The number of polyelectrolyte layers is one parameter to keep the ferrimagnetic ZFNCs separated during the silica coating process. FIG. 14 is a series of SEM images for silica-coated 130 nm ZFNC nanoparticles with varying numbers of polyelectrolyte LbL layers. The image in the upper left is of nanoparticles having zero polyelectrolyte layers; the image in the upper right is of nanoparticles with two layers; the image on the lower left is of nanoparticles with 4 layers; and the image on the lower right is of nanoparticles with 6 layers. In general, as the number of polyelectrolyte coatings increases, the tendency to form linear chains or aggregates during silica encapsulation decreases.

No single-core, ZFNC@SiO$_2$ particles were obtained when the 130 nm seed ZFNCs were coated with only 0 or 2 polyelectrolyte layers. The seed ZFNCs with four polyelectrolyte layers demonstrated few single-core ZFNC@SiO$_2$ particles, and large aggregates still dominate. Once the ZFNCs are encapsulated with six or more polyelectrolyte layers, discrete ZFNC@SiO$_2$ particles are clearly evident. The SEM images in FIG. 14 (lower right) and FIG. 10 show the gap distance between two seed particles is roughly twice as large as the silica layer thickness, indicative of discrete ZFNC@SiO$_2$.

Figure 15:
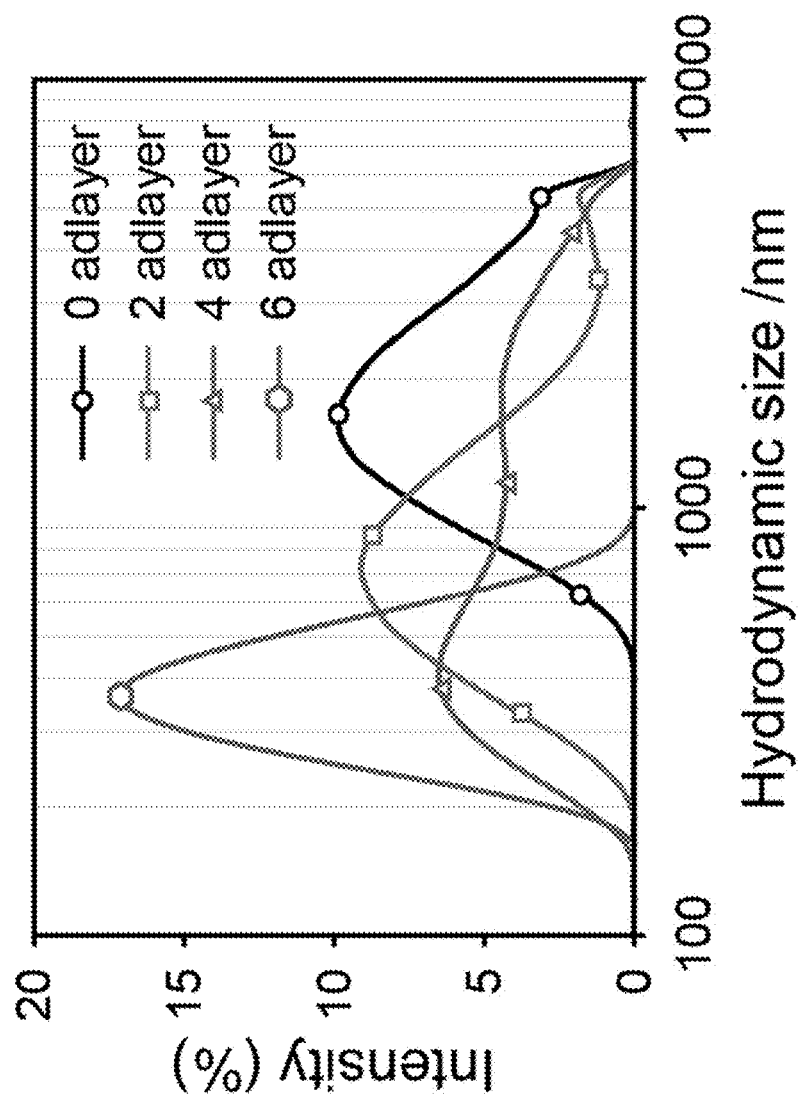
FIG. 15 is a graph of the hydrodynamic sizes for exemplary nanoparticles having zero (open circles), two (open squares), four (open triangles), and six (open hexagons) LbL layers.

Furthermore, the DLS size distributions of the different ZFNC@SiO$_2$ samples are in good agreement with the SEM data in FIG. 14. Only the silica-coated ZFNCs with six polyelectrolyte layers showed one prominent $D_{h,int}$ peak, as seen in FIG. 15. FIG. 15 shows the hydrodynamic sizes of silica-coated 130 nm ZNFCs containing zero (open circles; showing a maximum corresponding to a size over 1000 nm), two (open squares; showing a maximum corresponding to a size around 700 nm), four (open triangles; showing a maximum corresponding to a size around 400 nm), and six (open hexagons; showing a maximum corresponding to a size around 350 nm) polyelectrolyte layers.

As can be seen in FIG. 15, the average hydrodynamic size of the ZFNC@SiO$_2$ particles decreases with increasing polyelectrolyte layer; a testament to aggregation remediation. The colloidal stability of the ZFNC@SiO$_2$ particles also increases with the number of polyelectrolyte layers applied. The ZFNC@SiO$_2$ particles with six polyelectrolyte layers remained suspended for over 12 h in DI H$_2$O. However, the ZFNC@SiO$_2$ particles with 0 and 2 polyelectrolyte layers sedimented in less than 30 min in DI H$_2$O.

Together, the DLS and SEM data indicate that at least six polyelectrolyte layers are essential to stabilize the seed particles and ensure successful fabrication of discrete ZFNCs@SiO$_2$ particles. It is believed that the success of LbL stabilization is due to an increase in the closest approach distance between the ZFNCs, and therefore a reduction in magnetic dipole-dipole interaction, and electrostatic repulsion brought on by the charge of the outermost layer of the LbL-coated seed ZFNCs.

The exemplified nanoparticles disclosed herein were further characterized, as shown in Table 3:

TABLE 3

Characteristics of the Nanoparticles of Examples 1-3.

| MNP | m (EMU) | L (M)$^A$ | LBL (M)$^B$ | $H_{CORE}$ (OE)$^C$ | $H_{LBL}$ (OE)$^D$ | H CORE/LBL | H LBL/CORE |
|---|---|---|---|---|---|---|---|
| Ex. 1 | 194.0 × 10$^{-15}$ | 129.7 × 10$^{-9}$ | 14.7 × 10$^{-9}$ | 186.6 × 10$^3$ | 88.3 × 10$^3$ | 2.11 | 473 × 10$^{-3}$ |
| Ex. 2 | 397.0 × 10$^{-15}$ | 160.0 × 10$^{-9}$ | 34.3 × 10$^{-9}$ | 310.7 × 10$^3$ | 25.4 × 10$^3$ | 12.2 | 81.6 × 10$^{-3}$ |
| Ex. 3 | 397.0 × 10$^{-15}$ | 160.0 × 10$^{-9}$ | 31.2 × 10$^{-9}$ | 310.7 × 10$^3$ | 31.6 × 10$^3$ | 9.84 | 102 × 10$^{-3}$ |

In Table 3, L is the average core particle edge length; LbL is the layer-by-layer shell thickness determined by dynamic light scattering, which measures a hydrated diameter, resulting in an average and size distribution (only the average is reported above); $H_{core}$ is the magnetic field strength 10 nm from the core surface; and $H_{LbL}$ is the magnetic field strength at the outermost LbL surface.

A general scheme showing the relevant terms used in the calculations for the particles is shown below:

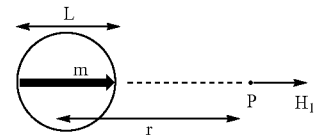

The equation used to calculate the strength of the magnetic field H in Table 3 is:

$$H = \frac{2mr}{\left[r^2 - \frac{L^2}{4}\right]^2}$$

Figure 16:
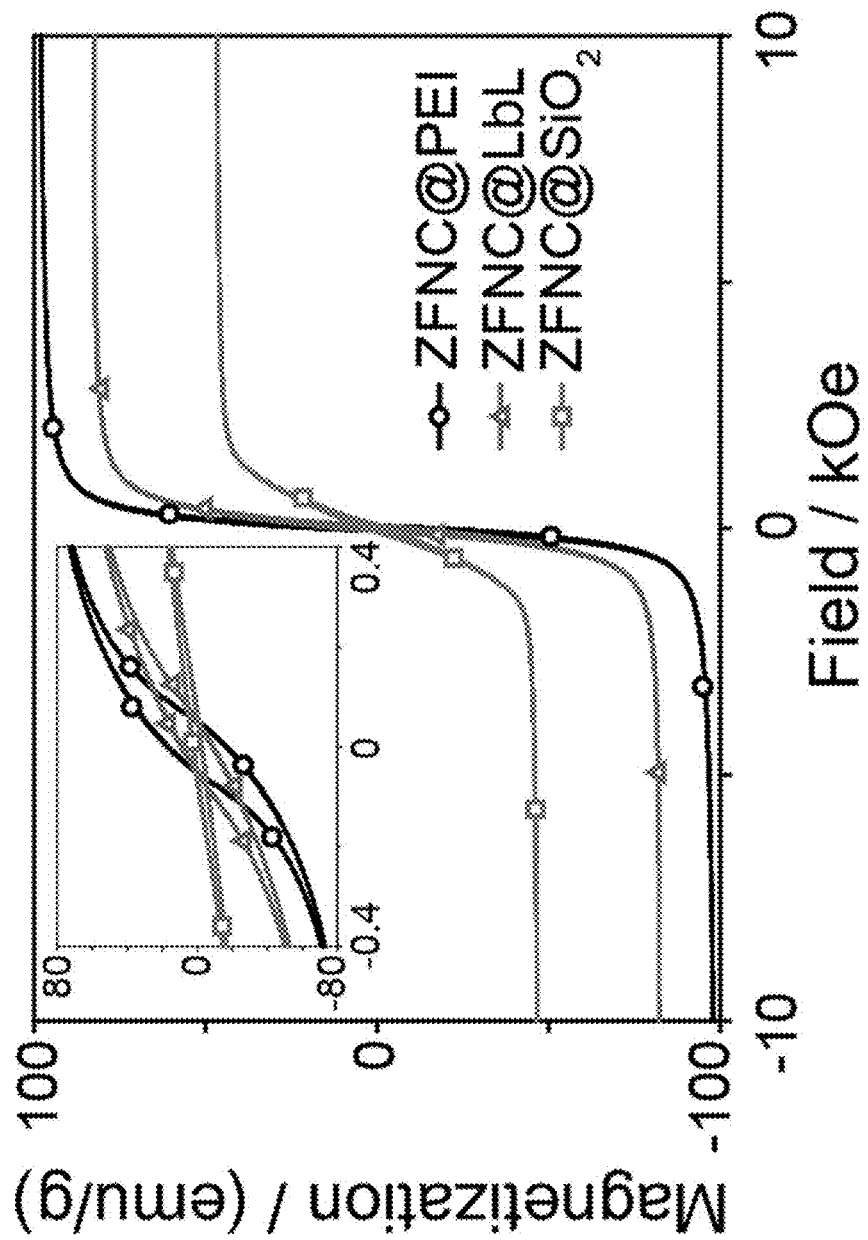
FIG. 16 shows hysteresis curves for exemplary nanoparticles having only a PEI coating (open circles), having LbL polyelectrolyte layers (open triangles), and having silica encapsulation (open squares).

To understand the ramifications that the coatings have on the resulting magnetic properties of the ZFNCs, a series of magnetometry experiments were performed. Shown in FIG. 16 are representative magnetization curves of PEI- (open circles), LbL-coated ZFNCs (open triangles), and ZFNC@SiO$_2$ (open squares). The measured values of M$_r$ and H$_c$ for the PEI-coated ZFNCs are 16.8 emu/g and 50.5 Oe, respectively, indicating that the ZFNCs are ferrimagnetic at room temperature. The value for M$_s$ (this is the quotient of the measured sample moment to the total mass of particles in the sample) of the PEI-coated ZFNCs is 98.4 emu/g at 298 K. This value is higher than the reported M$_s$ of magnetite nanoparticles (80-85 emu/g), which is consistent with the M$_s$ enhancement of Zn-doped Fe$_3$O$_4$ nanoparticles.

The magnetic moment of one ZFNC (Table 2) is estimated at $10^{-13}$ emu/particle (H=150 Oe) and $10^{-12}$ emu/particle at fields sufficient to saturate the sample (15,000 Oe). These values are also higher than that reported for Fe$_3$O$_4$ and other commercial magnetic particles. However, M$_s$ decreases with each coating step: 82.4 emu/g after six polyelectrolyte coatings and 46.9 emu/g after silica coating. This decrease is due to the increased mass of the non-magnetic coatings. However, increases slightly from 50.5 Oe to 51.8 Oe to 61.6 Oe when coated with PEI, LbL polyelectrolytes, and silica, respectively. It is believed that the increase in H$_c$ is a result of decreased magnetic dipole coupling. The polyelectrolyte and silica shells physically separate the core ZFNCs, which causes a reduction of the interaction field (magnetic dipole interactions decay as the cube of interparticle separation), leading to an increase in H$_c$.

Particle-particle interactions can be assessed by remanence techniques, as described above. The quantitative validity of these approaches depends on three assumptions: the particles are assumed to be single-domain ferromagnetic particles with uniaxial anisotropy. Given the size of these ZFNPs, it is anticipated that the particles are comprised of multiple domains. However, remanence techniques, which are based on comparing the IRM curve to the DCD curve, can still provide qualitative interaction information in systems that deviate from the basic assumptions.

Looking again at the Henkel plots (FIG. 3, upper graph) of the three 130 nm particle samples: PEI-coated ZFNCs (open circles), polyelectrolyte-coated ZFNCs (open triangles), and ZFNC@SiO$_2$ (open squares), all three MNPs demonstrate a negative curvature from the Wohlfarth line, with the magnitude of curvature decreasing from ZFNC@PEI to ZFNC@LbL to ZFNC@SiO$_2$. The negative deviation from the Wohlfarth line originates from magnetic dipole-dipole interactions. As the interaction increases, the magnitude of deviation increases. Thus, the magnetic dipole-dipole interaction of the PEI-coated particles is reduced by the added LbL-polyelectrolyte coating, and the interaction is further lessened by silica encapsulation.

The delta-m plots (FIG. 3, lower graph) of the three 130 nm particle samples, which represent a modified form of the Henkel representation, provide particle interaction information as a function of H. A non-interacting assembly of single-domain ferromagnetic particles with uniaxial anisotropy has a δm=0 at all H. However, all three 130 nm ZFNC systems demonstrate negative deviations from δm=0. A field-shift of the minimum of the δm plot to larger values as a function of coating step is also observed. That is, δm for the PEI-coated ZFNCs reaches a more negative value than that of the other two samples and decays faster at lower fields. Since the interparticle distance between the PEI-coated ZFNCs is smaller than that of the multiple polyelectrolyte- and silica-coated ZFNCs, the strong dipole coupling interaction field of the PEI-coated ZFNCs aids the other ZFNCs in close proximity to reverse their magnetization at a lower applied field. Therefore, an ensemble of the PEI-coated ZFNCs demagnetizes faster than that of ZFNCs encapsulated by further coatings. This indicates that the silica encapsulating layer separates ZFNCs and reduces their dipole-dipole interaction. The reduction of magnetic dipole coupling interactions by silica encapsulation is also consistent with the enhancement of the magnetic hardness (coercivity) of the ZFNCs@SiO$_2$ particles.

In summary, a method to deposit a uniform exterior coating around high moment (m~$10^{-13}$ emu/particle) ferrimagnetic zinc ferrite nanocubes is described herein. By depositing multiple polyelectrolyte layers around ZFNCs using an LbL process, a stable MNP suspension allows for the preparation of uniformly-coated individual ZFNC@SiO$_2$ particles. This encapsulation method provides a route for the preparation of discrete coated magnetic nanoparticles for use in many biomedical applications.

REFERENCES

Each of the following citations is fully incorporated herein by reference in its entirety.

Wang, J. N.; Zhang, L.; Yu, F.; Sheng, Z. M., Synthesis of Carbon Encapsulated Magnetic Nanoparticles with Giant Coercivity by a Spray Pyrolysis Approach. J. Phys. Chem. B 2007, 111, (8), 2119-2124.

Sun, S.; Murray, C. B.; Weller, D.; Folks, L.; Moser, A., Monodisperse FePt nanoparticles and ferromagnetic FePt nanocrystal superlattices. Science 2000, 287, (5460), 1989-1992.

Kobayashi, Y.; Horie, M.; Konno, M.; Rodriguez-Gonzalez, B.; Liz-Marzan, L. M., Preparation and Properties of Silica-Coated Cobalt Nanoparticles. J. Phys. Chem. B 2003, 107, (30), 7420-7425.

Dai, Q.; Lam, M.; Swanson, S.; Yu, R.-H. R.; Milliron, D. J.; Topuria, T.; Jubert, P.-O.; Nelson, A., Monodisperse cobalt ferrite nanomagnets with uniform silica coatings. Langmuir 2010, 26, 17546-51.

Dai, Q.; Berman, D.; Virwani, K.; Frommer, J.; Jubert, P.-O.; Lam, M.; Topuria, T.; Imaino, W.; Nelson, A., Self-Assembled Ferrimagnet—Polymer Composites for Magnetic Recording Media. Nano Lett. 2010, 10, (8), 3216-3221.

Pankhurst, Q. A.; Connolly, J.; Jones, S. K.; Dobson, J., Applications of magnetic nanoparticles in biomedicine. J. Phys. D: Appl. Phys. 2003, 36, (13), R167-R181.

Laurent, S.; Forge, D.; Port, M.; Roch, A.; Robic, C.; Vander Elst, L.; Muller, R. N., Magnetic iron oxide nanoparticles: synthesis, stabilization, vectorization, physicochemical characterizations, and biological applications. Chem. Rev. 2008, 108, (6), 2064-2110.

He, J.; Huang, M.; Wang, D.; Zhang, Z.; Li, G., Magnetic separation techniques in sample preparation for biological analysis: A review. J. Pharm. Biomed. Anal. 2014.

Zhang, M.; Xie, X.; Wang, S. X.; Criddle, C. S. Magnetically Separable Synthetic Nanoparticles for Water Treatment. U.S. patent application Ser. No. 14/032,033, 2013.

Tang, S. C.; Lo, I., Magnetic nanoparticles: essential factors for sustainable environmental applications. Water Res. 2013, 47, (8), 2613-2632.

Liu, W.-T., Nanoparticles and their biological and environmental applications. J. Biosci. Bioeng. 2006, 102, (1), 1-7.

Cumbal, L.; Greenleaf, J.; Leun, D.; SenGupta, A. K., Polymer supported inorganic nanoparticles: characterization and environmental applications. React. Funct. Polym. 2003, 54, (1), 167-180.

Yoon, T.-J.; Lee, W.; Oh, Y.-S.; Lee, J.-K., Magnetic nanoparticles as a catalyst vehicle for simple and easy recycling. New J. Chem. 2003, 27, (2), 227-229.

Xu, C.; Sun, S., New forms of superparamagnetic nanoparticles for biomedical applications. Adv. Drug Delivery Rev. 2013, 65, (5), 732-743.

Genc, S.; Derin, B., Synthesis and rheology of ferrofluids: a review. Curr. Opin. Chem. Eng. 2014, 3, 118-124.

Ahrens, E. T.; Bulte, J. W., Tracking immune cells in vivo using magnetic resonance imaging. Nat. Rev. Immunol. 2013, 13, (10), 755-763.

Balasubramaniam, S.; Kayandan, S.; Lin, Y.-N.; Kelly, D. F.; House, M. J.; Woodward, R. C.; St. Pierre, T. G.; Riffle, J. S.; Davis, R. M., Toward Design of Magnetic Nanoparticle Clusters Stabilized by Biocompatible Diblock Copolymers for T 2-Weighted MM Contrast. Langmuir 2014, 30, (6), 1580-1587.

Chen, Y.; Li, M.; Hong, Y.; Lam, J. W.; Zheng, Q.; Tang, B. Z., Dual-Modal MRI Contrast Agent with Aggregation-Induced Emission Characteristic for Liver Specific Imaging with Long Circulation Lifetime. ACS App. Mater. Inter. 2014, 6, (13), 10783-10791.

Pablico-Lansigan, M. H.; Situ, S. F.; Samia, A. C. S., Magnetic particle imaging: advancements and perspectives for real-time in vivo monitoring and image-guided therapy. Nanoscale 2013, 5, (10), 4040-4055.

Vivero Escoto, J. L.; Rieter, W. J.; Lau, H.; Huxford Phillips, R. C.; Lin, W., Biodegradable Polysilsesquioxane Nanoparticles as Efficient Contrast Agents for Magnetic Resonance Imaging. Small 2013, 9, (20), 3523-3531.

Tondra, M.; Smith, C., Integrated detection of nanomagnetic bioassay labels. Proc. SPIE-Int. Soc. Opt. Eng. 2005, 5732, 417-425.

Millen, R. L.; Kawaguchi, T.; Granger, M. C.; Porter, M. D.; Tondra, M., Giant Magnetoresistive Sensors and Superparamagnetic Nanoparticles: A Chip-Scale Detection Strategy for Immunosorbent Assays. Anal. Chem. 2005, 77, (20), 6581-6587.

Li, G.; Wang, S. X.; Sun, S., Model and experiment of detecting multiple magnetic nanoparticles as biomolecular labels by spin valve sensors. IEEE Trans. Magn. 2004, 40, (4, Pt. 2), 3000-3002.

Baselt, D. R. Biosensor using magnetically detected label. U.S. Pat. No. 5,981,297, 1999.

Herrmann, I. K.; Urner, M.; Graf, S.; Schumacher, C. M.; Roth Z'graggen, B.; Hasler, M.; Stark, W. J.; Beck Schimmer, B., Endotoxin Removal by Magnetic Separation Based Blood Purification. Adv. Healthc. Mater. 2013, 2, (6), 829-835.

Herrmann, I. K.; Schlegel, A.; Graf, R.; Schumacher, C. M.; Senn, N.; Hasler, M.; Gschwind, S.; Hirt, A.-M.; Günther, D.; Clavien, P.-A., Nanomagnet-based removal of lead and digoxin from living rats. Nanoscale 2013, 5, (18), 8718-8723.

Zeltner, M.; Grass, R. N.; Schaetz, A.; Bubenhofer, S. B.; Luechinger, N. A.; Stark, W. J., Stable dispersions of ferromagnetic carbon-coated metal nanoparticles: preparation via surface initiated atom transfer radical polymerization. J. Mater. Chem. 2012, 22, (24), 12064-12071.

Vestal, C. R.; Zhang, Z. J., Synthesis and magnetic characterization of Mn and Co spinel ferrite-silica nanoparticles with tunable magnetic core. Nano Lett. 2003, 3, (12), 1739-1743.

Keng, P. Y.; Shim, I.; Korth, B. D.; Douglas, J. F.; Pyun, J., Synthesis and self-assembly of polymer-coated ferromagnetic nanoparticles. ACS Nano 2007, 1, (4), 279-292.

Kolhatkar, A. G.; Nekrashevich, I.; Litvinov, D.; Willson, R. C.; Lee, T. R., Cubic Silica-Coated and Amine-Functionalized FeCo Nanoparticles with High Saturation Magnetization. Chem. Mater. 2013, 25, 1092-1097.

Wong, J. E.; Gaharwar, A. K.; Muller-Schulte, D.; Bahadur, D.; Richtering, W., Magnetic Nanoparticle-Polyelectrolyte Interaction: A Layered Approach for Biomedical Applications. J. Nanosci. Nanotechnol. 2008, 8, (8), 4033-4040.

Sun, B.; Zhang, Y.; Gu, K.-J.; Shen, Q.-D.; Yang, Y.; Song, H., Layer-by-layer assembly of conjugated polyelectrolytes on magnetic nanoparticle surfaces. Langmuir 2009, 25, (10), 5969-5973.

Caruso, F.; Lichtenfeld, H.; Giersig, M.; Möhwald, H., Electrostatic self-assembly of silica nanoparticle-polyelectrolyte multilayers on polystyrene latex particles. J. Am. Chem. Soc. 1998, 120, (33), 8523-8524.

Hu, W.; Wilson, R. J.; Koh, A.; Fu, A.; Faranesh, A. Z.; Earhart, C. M.; Osterfeld, S. J.; Han, S.-J.; Xu, L.; Guccione, S.; Sinclair, R.; Wang, S. X., High-Moment Antiferromagnetic Nanoparticles with Tunable Magnetic Properties. Adv. Mater. 2008, 20, (8), 1479-1483.

Zhang, M.; Earhart, C. M.; Ooi, C.; Wilson, R. J.; Tang, M.; Wang, S. X., Functionalization of high-moment magnetic nanodisks for cell manipulation and separation. Nano Res. 2013, 6, (10), 745-751.

Van Roosbroeck, R.; Van Roy, W.; Stakenborg, T.; Trekker, J.; D'Hollander, A.; Dresselaers, T.; Himmelreich, U.; Lammertyn, J.; Lagae, L., Synthetic Antiferromagnetic Nanoparticles as Potential Contrast Agents in Mill. ACS Nano 2014, 8, (3), 2269-2278.

Mahmoudi, M.; Sant, S.; Wang, B.; Laurent, S.; Sen, T., Superparamagnetic iron oxide nanoparticles (SPIONs): development, surface modification and applications in chemotherapy. Adv. Drug Delivery Rev. 2011, 63, (1), 24-46.

Faraudo, J.; Andreu, J. S.; Camacho, J., Understanding diluted dispersions of superparamagnetic particles under strong magnetic fields: a review of concepts, theory and simulations. Soft Matter 2013, 9, (29), 6654-6664.

Colombo, M.; Carregal-Romero, S.; Casula, M. F.; Gutiérrez, L.; Morales, M. P.; Böhm, I. B.; Heverhagen, J. T.; Prosperi, D.; Parak, W. J., Biological applications of magnetic nanoparticles. Chem. Soc. Rev. 2012, 41, (11), 4306-4334.

Lattuada, M.; Hatton, T. A., Functionalization of monodisperse magnetic nanoparticles. Langmuir 2007, 23, 2158-68.

Lu, A.-H.; Salabas, E. L.; Schüth, F., Magnetic nanoparticles: synthesis, protection, functionalization, and application. Angew. Chem. Int. Ed. 2007, 46, 1222-44.

Cheon, J.; Jun, Y.-w.; Choi, J.-s. Water-Soluble Nanoparticles Stabilized with Multi-Functional Group Ligands and Method of Preparation Thereof. USPTO CA2576975 A1, 2013.

Marcelo, G.; Munoz-Bonilla, A.; Rodriguez-Hernandez, J.; Fernandez-Garcia, M., Hybrid materials achieved by polypeptide grafted magnetite nanoparticles through a dopamine biomimetic surface anchored initiator. Polym. Chem. 2013, 4, (3), 558-567.

Parks, G., The isoelectric points of solid oxides, solid hydroxides, and aqueous hydroxo complex systems. Chem. Rev. 1965, 65, 177-198.

Thirumal, E.; Prabhu, D.; Chattopadhyay, K.; Ravichandran, V., Magnetic, electric and dielectric properties of FeCo alloy nanoparticles dispersed in amorphous matrix. Phys. Status Solidi A 2010, 207, (11), 2505-2510.

Falqui, A.; Corrias, A.; Gass, M.; Mountjoy, G., A Transmission Electron Microscopy Study of Fe—Co Alloy Nanoparticles in Silica Aerogel Matrix Using HREM, EDX, and EELS. Microsc. Microanal. 2009, 15, (02), 114-124.

Carta, D.; Bullita, S.; Casula, M. F.; Casu, A.; Falqui, A.; Corrias, A., Cubic Mesoporous Silica (SBA 16) Prepared Using Butanol as the Co Surfactant: A General Matrix for the Preparation of FeCo SiO2 Nanocomposites. ChemPlusChem 2013, 78, (4), 364-374.

Marcelo, G.; Perez, E.; Corrales, T.; Peinado, C., Stabilization in Water of Large Hydrophobic Uniform Magnetite Cubes by Silica Coating. J. Phys. Chem. C 2011, 115, (51), 25247-25256.

Noh, S.-H.; Na, W.; Jang, J.-T.; Lee, J.-H.; Lee, E. J.; Moon, S. H.; Lim, Y.; Shin, J.-S.; Cheon, J., Nanoscale magnetism control via surface and exchange anisotropy for optimized ferrimagnetic hysteresis. Nano Lett. 2012, 12, 3716-21.

Stöber, W.; Fink, A.; Bohn, E., Controlled growth of monodisperse silica spheres in the micron size range. J. Colloid Interface Sci. 1968, 26, 62-69.

Downs, R. T., The RRUFF Project: an integrated study of the chemistry, crystallography, Raman and infrared spectroscopy of minerals. In Program and Abstracts of the 19th General Meeting of the International Mineralogical Association, Kobe, Japan, 2006.

Swanson, H. E.; McMurdie, H. F.; Morris, M. C.; Evans, E. H.; Paretzkin, B., Standard x-ray diffraction powder patterns, NBS monograph 25, sections 5 and 9. Institute for Materials Research, National Bureau of Standards: 1971.

Jang, J.-t.; Nah, H.; Lee, J.-H.; Moon, S. H.; Kim, M. G.; Cheon, J., Critical enhancements of MRI contrast and hyperthermic effects by dopant-controlled magnetic nanoparticles. Angew. Chem. Int. Ed. 2009, 48, 1234-8.

Swanson, H. E.; McMurdie, H. F.; Morris, M. C.; Evans, E. H., Standard X-ray diffraction powder patterns, NBS monograph 25, section 5. Institute for Materials Research, National Bureau of Standards: 1967.

Mourdikoudis, S.; Liz-Marzán, L., Oleylamine in Nanoparticle Synthesis. Chem. Mater. 2013, 25, 1465-1476.

Nann, T., Phase-transfer of CdSe@ ZnS quantum dots using amphiphilic hyperbranched polyethylenimine. Chem. Commun. 2005, (13), 1735-1736.

Fratila, R. M.; Mitchell, S. G.; Del Pino, P.; Grazu, V.; de la Fuente, J. M., Strategies for the Biofunctionalization of Gold and Iron Oxide Nanoparticles. Langmuir 2014.

Goon, I. Y.; Lai, L. M. H.; Lim, M.; Munroe, P.; Gooding, J. J.; Amal, R., Fabrication and Dispersion of Gold-Shell-Protected Magnetite Nanoparticles: Systematic Control Using Polyethyleneimine. Chem. Mater. 2009, 21, 673-681.

Mørup, S.; Hansen, M. F.; Frandsen, C., Magnetic interactions between nanoparticles. Beilstein J. Nanotech. 2010, 1, 182-90.

Mørup, S.; Hansen, M. F.; Frandsen, C., Magnetic interactions between nanoparticles. Beilstein J. Nanotech. 2010, 1, (1), 182-190.

Krogman, K.; Cohen, R.; Hammond, P.; Rubner, M.; Wang, B., Industrial-scale spray layer-by-layer assembly for production of biomimetic photonic systems. Bioinspir. Biomim. 2013, 8, (4), 045005.

Caruso, F.; Spasova, M.; Susha, A.; Giersig, M.; Caruso, R. A., Magnetic nanocomposite particles and hollow spheres constructed by a sequential layering approach. Chem. Mater. 2001, 13, (1), 109-116.

Caruso, F.; Caruso, R. A.; Möhwald, H., Nanoengineering of inorganic and hybrid hollow spheres by colloidal templating. Science 1998, 282, (5391), 1111-1114.

Cornell, R.; Schwertmann, U., The iron oxides: structure, properties, reactions, occurrences and uses. 2nd ed.; WILEY-VCH Verlag GmbH & Co. KGaA: Weinheim, 2003.

Yang, Y.; Liu, X.; Yang, Y.; Xiao, W.; Li, Z.; Xue, D.; Li, F.; Ding, J., Synthesis of nonstoichiometric zinc ferrite nanoparticles with extraordinary room temperature magnetism and their diverse applications. J. Mater. Chem. C 2013, 1, 2875.

Zhou, Y.; Tang, Z.; Shi, C.; Shi, S.; Qian, Z.; Zhou, S., Polyethylenimine functionalized magnetic nanoparticles as a potential non-viral vector for gene delivery. J. Mater. Sci.—Mater. Med. 2012, 23, (11), 2697-2708.

Xu, L.; Yang, L.; Luo, M.; Liang, X.; Wei, X.; Zhao, J.; Liu, H., Reduction of hexavalent chromium by Pannonibacter phragmitetus LSSE-09 coated with polyethylenimine-functionalized magnetic nanoparticles under alkaline conditions. J. Hazard. Mater. 2011, 189, (3), 787-793.

Yu, J.; Yi, B.; Xing, D.; Liu, F.; Shao, Z.; Fu, Y.; Zhang, H., Degradation mechanism of polystyrene sulfonic acid membrane and application of its composite membranes in fuel cells. Phys Chem Chem Phys 2003, 5, (3), 611-615.

Beyer, S.; Bai, J.; Blocki, A. M.; Kantak, C.; Xue, Q.; Raghunath, M.; Trau, D., Assembly of biomacromolecule loaded polyelectrolyte multilayer capsules by using water soluble sacrificial templates. Soft Matter 2012, 8, (9), 2760-2768.

Martinez, J.; Ruiz, F.; Vorobiev, Y. V.; Perez-Robles, F.; Gonzalez-Hernandez, J., Infrared spectroscopy analysis of the local atomic structure in silica prepared by sol-gel. J. Chem. Phys. 1998, 109, (17), 7511-7514.

McDonald, R. S., Surface functionality of amorphous silica by infrared spectroscopy. J. Phys. Chem. 1958, 62, (10), 1168-1178.

Malvern Instruments, Dynamic Light Scattering: An Introduction in 30 Minutes 2015, Documnet No. MRK656-01.

Lim, E.-K.; Kim, T.; Paik, S.; Haam, S.; Huh, Y.-M.; Lee, K., Nanomaterials for Theranostics: Recent Advances and Future Challenges. Chem. Rev. 2014.

Vereda, F.; de Vicente, J.; Morales, M. d. P.; Rull, F.; Hidalgo-Álvarez, R., Synthesis and characterization of single-domain monocrystalline magnetite particles by oxidative aging of Fe (OH) 2. J. Phys. Chem. C 2008, 112, (15), 5843-5849.

Wang, W.; Wang, Y.; Tu, L.; Feng, Y.; Klein, T.; Wang, J.-P., Magnetoresistive performance and comparison of supermagnetic nanoparticles on giant magnetoresistive sensor-based detection system. Sci. Rep. 2014, 4, 1-5.

Lee, D. C.; Mikulec, F. V.; Pelaez, J. M.; Koo, B.; Korgel, B. A., Synthesis and magnetic Morales, M.; Munoz-Aguado, M.; Garcia-Palacios, J.; Lazaro, F.; Serna, C., Coercivity enhancement in γ-Fe2O3 particles dispersed at low-volume fraction. J. Magn. Magn. Mater. 1998, 183, (1), 232-240.

Che, X.-d.; Neal Bertram, H., Phenomenology of δM curves and magnetic interactions. J. Magn. Magn. Mater. 1992, 116, (1), 121-127.

Laureti, S.; Varvaro, G.; Testa, A.; Fiorani, D.; Agostinelli, E.; Piccaluga, G.; Musinu, A.; Ardu, A.; Peddis, D., Magnetic interactions in silica coated nanoporous assemblies of CoFe2O4 nanoparticles with cubic magnetic anisotropy. Nanotechnology 2010, 21, (31), 315701.

Zeng, H.; Li, J.; Wang, Z. L.; Liu, J. P.; Sun, S., Interparticle interactions in annealed FePt nanoparticle assemblies. 2002.

Blanco-Mantecon, M.; O'Grady, K., Interaction and size effects in magnetic nanoparticles. J. Magn. Magn. Mater. 2006, 296, (2), 124-133.

Wohlfarth, E., Relations between different modes of acquisition of the remanent magnetization of ferromagnetic particles. J. Appl. Phys. 1958, 29, (3), 595-596.

Henkel, O., Remanenzverhalten and Wechselwirkungen in hartmagnetischen Teilchenkollektiven. Phys. Status Solidi B 1964, 7, (3), 919-929.

Binns, C., Nanomagnetism: Fundamentals and Applications. Elsevier: Amsterdam, 2014; Vol. 6.

Kelly, P.; O'Grady, K.; Mayo, P.; Chantrell, R., Switching mechanisms in cobalt-phosphorus thin films. IEEE Trans. Magn. 1989, 25, 3881-3883.

Wang, W.; Wang, Y.; Tu, L.; Feng, Y.; Klein, T.; Wang, J.-P., Magnetoresistive performance and comparison of supermagnetic nanoparticles on giant magnetoresistive sensor-based detection system. Sci. Rep. 2014, 4, 1-5.

Various features and advantages of the invention are set forth in the following claims.

What is claimed is:

1. A nanoparticle comprising
a magnetic core particle coated with at least one hydrophilic coating,
a plurality of layers coupled to the hydrophilic coating, wherein the plurality of layers comprises alternating layers of at least one polycationic layer and at least one polyanionic layer, and
a protective exterior coating,
wherein the magnetic particle has a diameter of at least 100 nm and exhibits a magnetic moment of at least about $1.5 \times 10^{-13}$ emu.

2. The nanoparticle of claim 1, wherein the plurality of layers comprise at least one of a polystyrene, a poly(allylamine), a poly(lysine), an alginate, hyaluronan, a poly(glutamic acid), a poly(lactic acid), a poly(acrylic acid), a poly(methacrylic acid), chitosan, a poly(ethylenimine), a diallyldimethylammonium halide, N-methyl-N-vinylacetamide, a poly(vinyl sulfate), a poly(vinyl sulfonate), a poly(3-thiophene acetic acid), a poly(maleic acid), or a poly(ethylene).

3. The nanoparticle of claim 1, wherein the hydrophilic coating comprises at least one of citric acid, dimercaptosuccinic acid, poly(ethyleneimine), poly(allylamine) or polystyrene sulfonate.

4. The nanoparticle of claim 1, wherein the protective exterior coating comprises silica or titania.

5. The nanoparticle of claim 1, wherein the core particle comprises a zinc ferrite cubic particle having a minimum edge length of at least about 100 nm, and wherein the plurality of layers comprises at least six layers.

6. The nanoparticle of claim 1, wherein the average diameter of the nanoparticle is between about 100 nm and about 300 nm.

7. A method for preparing a nanoparticle, comprising:
depositing a hydrophilic coating on a magnetic core particle to form a coated particle,
depositing a plurality of layers on the coated particle to form a layer-coated particle, wherein the plurality of layers comprises alternating layers of at least one polycationic layer and at least one polyanionic layer, and
depositing a protective coating on the exterior of the layer-coated particle to form the nanoparticle,
wherein the magnetic particle has a diameter of at least 100 nm and exhibits a magnetic moment of at least about $1.5 \times 10^{-13}$ emu.

8. The method of claim 7, wherein the plurality of layers comprise at least one of a polystyrene, a poly(allylamine), a poly(lysine), an alginate, hyaluronan, a poly(glutamic acid), a poly(lactic acid), a poly(acrylic acid), a poly(methacrylic acid), chitosan, a poly(ethylenimine), a diallyldimethylammonium halide, N-methyl-N-vinylacetamide, a poly(vinyl sulfate), a poly(vinyl sulfonate), a poly(3-thiophene acetic acid), a poly(maleic acid), or a poly(ethylene).

9. The method of claim 7, wherein the exterior coating comprises silica or titania.

10. A nanoparticle comprising
a magnetic core particle comprising a zinc ferrite cubic particle having a minimum edge length of at least about 100 nm,
a plurality of layers comprising alternating layers of at least one polycationic layer and at least one polyanionic layer, and
protective exterior coating,
wherein the magnetic particle exhibits a magnetic moment of at least about $1.5 \times 10^{-13}$ emu and wherein the plurality of layers comprises at least six layers.

11. The nanoparticle of claim 10, wherein the plurality of layers comprise at least one of a polystyrene, a poly(allylamine), a poly(lysine), an alginate, hyaluronan, a poly(glutamic acid), a poly(lactic acid), a poly(acrylic acid), a poly(methacrylic acid), chitosan, a poly(ethylenimine), a diallyldimethylammonium halide, N-methyl-N-vinylacetamide, a poly(vinyl sulfate), a poly(vinyl sulfonate), a poly(3-thiophene acetic acid), a poly(maleic acid), or a poly(ethylene).

12. The nanoparticle of claim 10, wherein the core particle is further coated with at least one hydrophilic coating and the plurality of layers is coupled to the hydrophilic coating.

13. The nanoparticle of claim 12, wherein the hydrophilic coating comprises at least one of citric acid, dimercaptosuccinic acid, poly(ethyleneimine), poly(allylamine) or polystyrene sulfonate.

14. The nanoparticle of claim 10, wherein the exterior coating comprises silica or titania.

15. The nanoparticle of claim 10, wherein the average diameter of the nanoparticle is between about 100 nm and about 300 nm.

* * * * *